US012726606B2

(12) United States Patent
Lee et al.

(10) Patent No.: US 12,726,606 B2
(45) Date of Patent: Sep. 1, 2026

(54) WEARABLE ELECTRONIC DEVICE SUPPORTING CAMERA ACTIVATION NOTIFICATION AND METHOD FOR OPERATION THE SAME

(71) Applicant: SAMSUNG ELECTRONICS CO., LTD., Suwon-si (KR)

(72) Inventors: Hyojung Lee, Suwon-si (KR); Jinchoul Lee, Suwon-si (KR); Juhwan Yun, Suwon-si (KR); Hyunseung Yoon, Suwon-si (KR); Junmyeong Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/278,402

(22) Filed: Jul. 23, 2025

(65) Prior Publication Data

US 2026/0046387 A1 Feb. 12, 2026

Related U.S. Application Data

(63) Continuation of application No. PCT/KR2025/009730, filed on Jul. 7, 2025.

(30) Foreign Application Priority Data

Aug. 11, 2024 (KR) ........................ 10-2024-0107242
Oct. 25, 2024 (KR) ........................ 10-2024-0147613

(51) Int. Cl.
*H04N 23/611* (2023.01)
*G06F 3/14* (2006.01)
(Continued)

(52) U.S. Cl.
CPC ......... *H04N 17/002* (2013.01); *G06F 3/1423* (2013.01); *H04N 23/56* (2023.01); *H04N 23/611* (2023.01)

(58) Field of Classification Search
CPC .... H04N 17/002; H04N 23/56; H04N 23/611; H04N 23/634; G06F 3/1423
See application file for complete search history.

(56) References Cited

U.S. PATENT DOCUMENTS 8,040,361 B2 10/2011 Bachelder et al.
8,896,629 B2 11/2014 Meier et al.
(Continued)

FOREIGN PATENT DOCUMENTS

JP 6346131 B2 6/2018
JP 2023-511639 A 3/2023
(Continued)

OTHER PUBLICATIONS

International Search Report and Written Opinion dated Sep. 30, 2025, issued by the International Searching Authority in International Application No. PCT/KR2025/009730.

*Primary Examiner* — Antonio Xavier
(74) *Attorney, Agent, or Firm* — Sughrue Mion, PLLC

(57) ABSTRACT

There is provided an electronic device and a method of operating the electronic device. For example, the method may include, based on obtaining an execution request of a first camera, identifying whether a light emitter used for providing a notification indicating that the first camera is activated has an abnormality, based on identifying that the light emitter has no abnormality, controlling the light emitter to output the notification, based on identifying that the light emitter has the abnormality, identifying whether an alternative notification method is available to provide an alternative notification indicating that the first camera is activated is, and based on identifying that the alternative notification method is available, outputting the alternative notification using the alternative notification method.

18 Claims, 19 Drawing Sheets

(51) Int. Cl.
*H04N 17/00* (2006.01)
*H04N 23/56* (2023.01)

(56) References Cited

U.S. PATENT DOCUMENTS

| | | | | |
|---|---|---|---|---|
| 10,614,589 | B2 | 4/2020 | Shinohara | |
| 11,030,771 | B2 | 6/2021 | Shinohara | |
| 11,113,891 | B2 | 9/2021 | Noris et al. | |
| 11,244,483 | B2 | 2/2022 | Pollard et al. | |
| 11,361,513 | B2 | 6/2022 | Lohr et al. | |
| 11,669,422 | B2 | 6/2023 | Kim | |
| 11,741,649 | B2 | 8/2023 | Pollard et al. | |
| 11,885,964 | B2 | 1/2024 | Shin et al. | |
| 11,989,842 | B2 | 5/2024 | Lohr et al. | |
| 12,154,201 | B2 | 11/2024 | Pollard et al. | |
| 12,225,175 | B2 | 2/2025 | Choi et al. | |
| 12,339,758 | B2 | 6/2025 | Kim | |
| 2014/0351206 | A1 | 11/2014 | Lim | |
| 2015/0015459 | A1 | 1/2015 | Cho et al. | |
| 2019/0377958 | A1* | 12/2019 | Geiler | G08B 13/19686 |
| 2023/0341752 | A1* | 10/2023 | Schwab | G03B 17/18 |

FOREIGN PATENT DOCUMENTS

| | | | |
|---|---|---|---|
| KR | 10-1280079 | B1 | 6/2013 |
| KR | 10-2014-0136808 | A | 12/2014 |
| KR | 10-2015-0007130 | A | 1/2015 |
| KR | 10-2016-0008448 | A | 1/2016 |
| KR | 10-2019-0124175 | A | 11/2019 |
| KR | 10-2021-0071083 | A | 6/2021 |
| KR | 10-2021-0154814 | A | 12/2021 |
| KR | 10-2022-0097249 | A | 7/2022 |
| KR | 10-2524149 | B1 | 4/2023 |
| KR | 10-2024-0030881 | A | 3/2024 |

* cited by examiner

WEARABLE ELECTRONIC DEVICE SUPPORTING CAMERA ACTIVATION NOTIFICATION AND METHOD FOR OPERATION THE SAME

CROSS-REFERENCE TO RELATED APPLICATION(S)

This application is a continuation of an International application No. PCT/KR2025/009730 designating the United States, filed on Jul. 7, 2025, in the Korean Intellectual Property Receiving Office, which claims priority from Korean Patent Application No. 10-2024-0107242, filed on Aug. 11, 2024, and Korean Patent Application No. 10-2024-0147613, filed on Oct. 25, 2024, in the Korean Intellectual Property Office, the disclosures of each of which are incorporated by reference herein in their entireties.

BACKGROUND

1. Field

The disclosure relates to a wearable electronic device supporting a camera activation notification and a method for operating the same.

2. Description of Related Art

With digital technology advancing, electronic devices come in various types, such as smartphones, tablet personal computers (PCs), or personal digital assistants (PDAs). Moreover, electronic devices have been developed to be worn by users so as to enhance portability and user accessibility.

For example, electronic devices that users can wear are being developed as wearable electronic devices, such as augmented reality (AR) glasses, video see-through (VST) devices, and head-mounted display (HMD) devices, to provide virtual spaces in virtual environments, and a variety of services and additional functions provided by wearable electronic devices are gradually increasing. To meet the needs of various users and raise use efficiency of electronic devices, communication service carriers or device manufacturers are competing to develop electronic devices with differentiated and diversified functionalities. Accordingly, various functions that are provided through wearable electronic devices are evolving more and more.

Meanwhile, wearable electronic devices may capture images of the external environment through cameras. In this case, e.g., in order to protect the privacy of others, the wearable electronic device needs to provide an external notification indicating that the camera is activated.

The above-described information may be provided as related art for the purpose of helping understanding of the disclosure. No claim or determination is made as to whether any of the foregoing is applicable as background art in relation to the disclosure.

SUMMARY

According to an embodiment, a head-mounted display (HMD) device may be provided. The HMD device may comprise a first camera, a first display, a light emitter, at least one processor comprising processing circuitry, and memory comprising at least one storage medium storing instructions. The instructions may be configured to, when executed individually or collectively by the at least one processor, cause the HMD device to perform at least one operation. The at least one operation may include, based on obtaining an execution request of a first camera capturing an image in a front direction of the HMD device, identifying whether a light emitter, which is configured to provide a notification indicating that the first camera is activated, has an abnormality. The at least one operation may include, based on identifying that the light emitter has no abnormality, controlling the light emitter to output the notification. The at least one operation may include, based on identifying that the light emitter has the abnormality, identifying whether an alternative notification method is available to provide an alternative notification indicating that the first camera is activated. The at least one operation may include, based on identifying that the alternative notification method is available, outputting the alternative notification using the alternative notification method.

According to an embodiment, a method for operating an HMD device may be provided. The method for operating the HMD device may include at least one operation. The at least one operation may include, based on obtaining an execution request of a first camera capturing an image in a front direction of the HMD device, identifying whether a light emitter, which is configured to provide a notification indicating that the first camera is activated, has an abnormality. The at least one operation may include, based on identifying that the light emitter has no abnormality, controlling the light emitter to output the notification. The at least one operation may include, based on identifying that the light emitter has the abnormality, identifying whether an alternative notification method is available to provide an alternative notification indicating that the first camera is activated. The at least one operation may include, based on identifying that the alternative notification method is available, outputting the alternative notification using the alternative notification method.

According to an embodiment, there may be provided a computer-readable storage medium storing at least one instruction. The at least one instruction, when executed by at least some of at least one processor of an HMD device, may enable the HMD device to perform at least one operation. The at least one operation may include, based on obtaining an execution request of a first camera capturing an image in a front direction of the HMD device, identifying whether a light emitter, which is configured to provide a notification indicating that the first camera is activated, has an abnormality. The at least one operation may include, based on identifying that the light emitter has no abnormality, controlling the light emitter to output the notification. The at least one operation may include, based on identifying that the light emitter has the abnormality, identifying whether an alternative notification method is available to provide an alternative notification indicating that the first camera is activated. The at least one operation may include, based on identifying that the alternative notification method is available, outputting the alternative notification using the alternative notification method.

BRIEF DESCRIPTION OF DRAWINGS

The same or similar reference denotations may be used to refer to the same or similar elements throughout the specification and the drawings.

DETAILED DESCRIPTION

Figure 1:
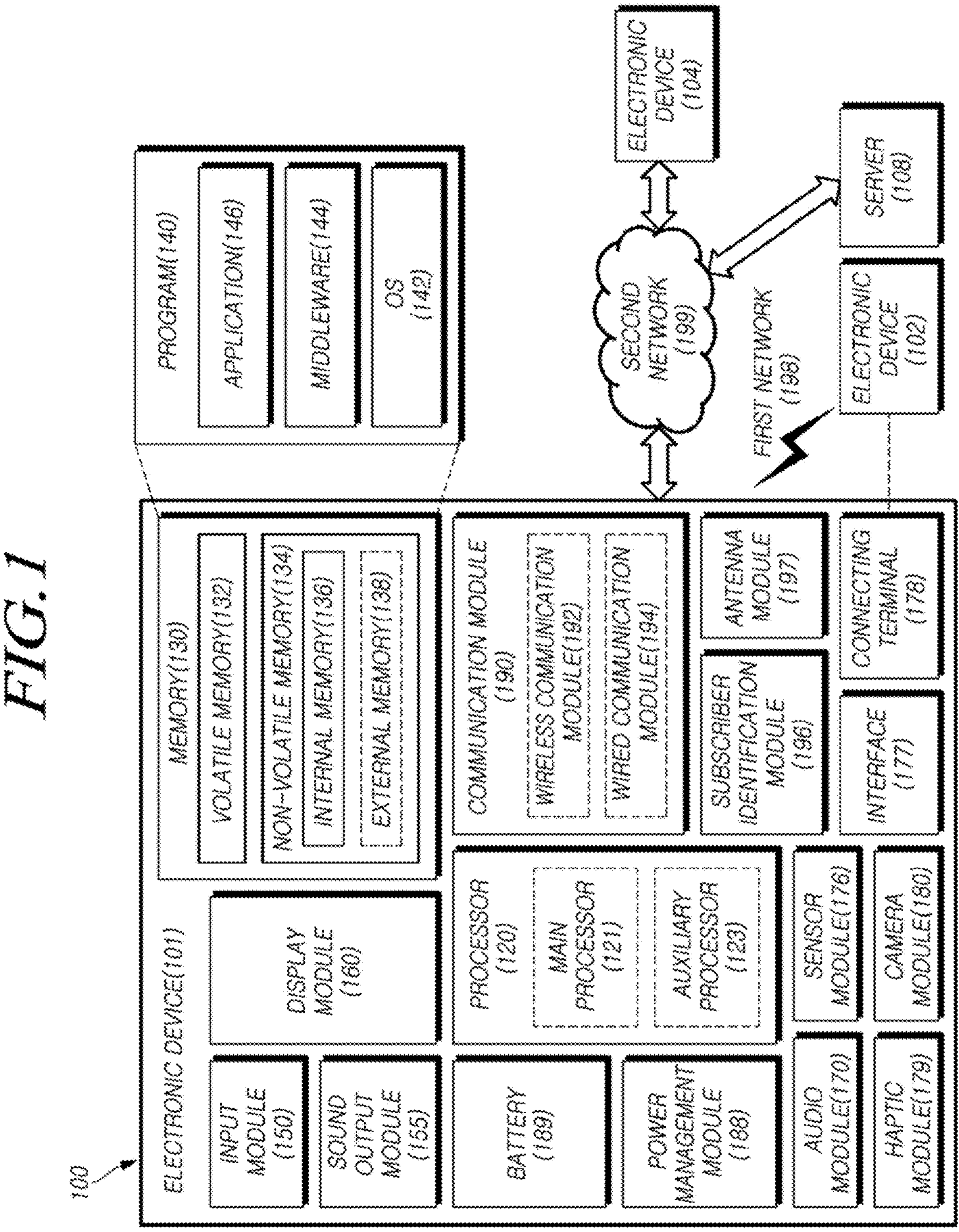
FIG. 1 is a block diagram illustrating an electronic device in a network environment according to various embodiments of the disclosure.

Hereinafter, embodiments of the disclosure are described in detail with reference to the drawings so that those skilled in the art to which the disclosure pertains may easily practice the disclosure. However, the disclosure may be implemented in other various forms and is not limited to the embodiments set forth herein. The same or similar reference denotations may be used to refer to the same or similar elements throughout the specification and the drawings. Further, for clarity and brevity, no description is made of well-known functions and configurations in the drawings and relevant descriptions.

FIG. 1 is a block diagram illustrating an electronic device in a network environment according to various embodiments of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a communication module 192 (e.g., a cellular communication module, a short-range communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The communication module 192 may identify or authenticate the electronic device 101 in a communication network, such as the first network 198 or the second network 199, using subscriber information (e.g., international mobile subscriber identity (IMSI)) stored in the subscriber identification module 196.

The communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The communication module 192 may support a high-frequency band (e.g., the mm Wave band) to achieve, e.g., a high data transmission rate. The communication module 192 may support various technologies for securing performance on a high-frequency band, such as, e.g., beam-forming, massive multiple-input and multiple-output (massive MIMO), full dimensional MIMO (FD-MIMO), array antenna, analog beam-forming, or large scale antenna. The communication module 192 may support various requirements specified in the electronic device 101, an external electronic device (e.g., the electronic device 104), or a network system (e.g., the second network 199). According to an embodiment, the communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mm Wave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
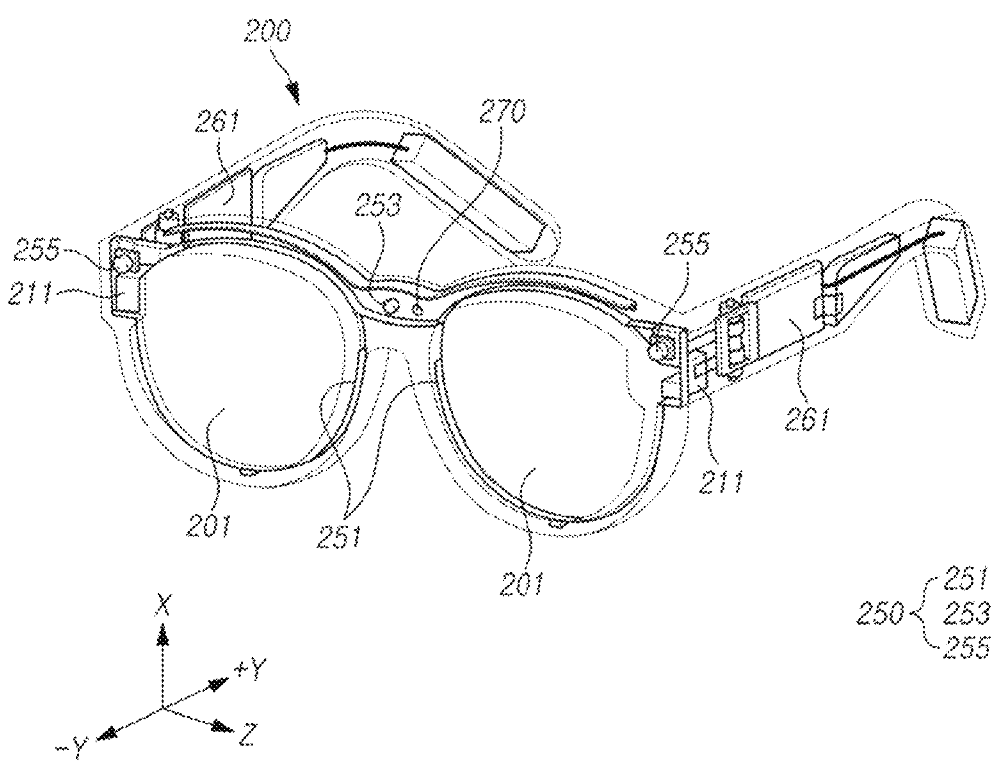
FIG. 2 is a view illustrating a configuration of a wearable electronic device according to an embodiment of the disclosure.

FIG. 2 is a view illustrating a configuration of a wearable electronic device according to an embodiment of the disclosure.

The components and operations of the components described with reference to FIG. 2 may be identical in whole or part to the components and operations of the components described with reference to FIG. 1. The components and operations of the components described with reference to FIG. 2 may be identical in whole or part to the components and operations of the components described with reference to FIGS. 3A to 14.

Referring to FIG. 2, according to an embodiment, a wearable electronic device 200 (e.g., the electronic device 101 of FIG. 1) may include a light output module 211, a display module 201, a camera module 250, a speaker 261, and/or a light emitter 270. However, the disclosure is not limited thereto, and as such, according to another embodiment, the wearable electronic device 200 may include one or more additional components.

According to an embodiment, the light output module 211 (e.g., the display module 160 of FIG. 1) may include a light source capable of outputting an image and a lens guiding the image to the display member 201. The light output module 211 may include, but is not limited to, a liquid crystal display, a digital mirror device, a liquid crystal on silicon, and/or an organic light emitting diode, or a micro light emitting diode.

According to an embodiment, the display member 201 (e.g., the display module 160 of FIG. 1) may include an optical waveguide (e.g., a waveguide). According to an embodiment, the image output from the light output module 211 incident on one end of the optical waveguide may propagate inside the optical waveguide and be provided to the user. According to an embodiment, the optical waveguide may include at least one diffractive element (e.g., a diffractive optical element (DOE) or a holographic optical element (HOE)) and/or a reflective element (e.g., a reflective mirror). For example, the optical waveguide may guide (e.g., direct) the image output from the light output module 211 to the eyes of the user using at least one diffractive element or reflective element.

According to an embodiment, the camera module 250 (e.g., the camera module 180 of FIG. 1) may capture an image (e.g., a still image and/or a video). According to an embodiment, the camera module 250 may be provided (or, disposed) in a lens frame and may be provided (or, disposed) around the display member 201. As used herein, image may be interpreted as including a video as well as a still image. According to an embodiment, the camera module may include, but is not limited to, a first camera module 251, a second camera module 253 and a third camera module 255.

According to an embodiment, the first camera module 251 may capture and/or recognize the trajectory of an eye of the user (e.g., pupil or iris) or gaze. According to an embodiment, the first camera module 251 may periodically or aperiodically transmit information related to the trajectory of the eye of the user or gaze (e.g., trajectory information) to the processor (e.g., the processor 120 of FIG. 1).

According to an embodiment, the second camera module 253 may capture an external image. For example, the second camera module 253 may capture an image of the external environment in the front direction of the wearable electronic device 200. However, the disclosure is not limited thereto, and as such, the second camera module 253 may be located at a position on the wearable electronic device 200 to capture an image in a direction other than the front direction of the wearable electronic device 200. For example, the second camera module 253 may capture an image in a side direction or a rear direction of the wearable electronic device 200.

According to an embodiment, a third camera module 255 may be used for hand detection and tracking, and recognition of a gesture of the user. The gesture of the user may include, but is not limited to, hand motion. According to an embodiment, the third camera module 255 may be used for three (3) degrees of freedom (3DoF) or 6DoF head tracking, location (space, environment) recognition and/or movement recognition. The second camera module 253 may also be used for hand detection and tracking and recognition of the gesture of the user gesture according to an embodiment. According to an embodiment, at least one of the first camera module 251, the second camera module 253, and the third camera module 255 may be replaced with a sensor module (e.g., a LiDAR sensor). For example, the sensor module may include at least one of a vertical cavity surface emitting laser (VCSEL), a diode, an IR sensor, an IR diode, and/or a photodiode.

According to an embodiment, the speaker 261 (e.g., the sound output module 155 of FIG. 1) may output a sound signal (e.g., a sound and/or a virtual vibration sound). Although the speaker 261 is configured on a member mounted on an ear of the user ear when the wearable electronic device 200 is worn as illustrated in FIG. 2, the disclosure is not limited thereto and may be configured at different positions according to the implementation of the wearable electronic device 200.

According to an embodiment, the light emitter 270 may emit light. For example, the light emitter 270 may emit light of at least one color (e.g., red, green and/or blue). The light emitter 270 may include, e.g., a light emitting diode (LED), a laser light emitting device, an electroluminescent device, a plasma light emitting device, and/or a chemical light emitting device, but is not limited thereto. According to an embodiment, the light emitter 270 may be used to provide a notification indicating the operation state of the second camera module 253. According to an embodiment, the light emitter 270 may provide a first notification indicating that the second camera module 253 is activated by emitting light. For example, the light emitter 270 may provide a first notification indicating that the second camera module 253 is activated by emitting light of a first color (e.g., red). According to an embodiment, the light emitter 270 may provide a second notification indicating that the second camera module 253 is deactivated by not emitting light. According to an embodiment, the light emitter 270 may provide a second notification indicating that the second camera module 253 is deactivated by emitting light of a second color (e.g., blue) different from the first color (e.g., red) for the first notification. Although the light emitter 270 is provided (or, disposed) at a position adjacent to the second camera module 253 in FIG. 2, the disclosure is not limited thereto and may be configured at different positions according to the implementation of the wearable electronic device 200.

Figure 3A:
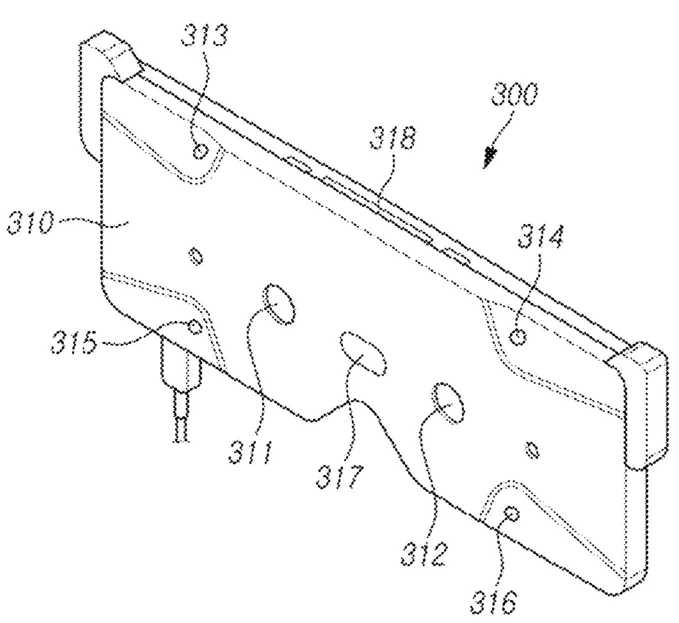
FIGS. 3A to 3C illustrate front and rear views of a wearable electronic device according to an embodiment of the disclosure.
Figure 3B:
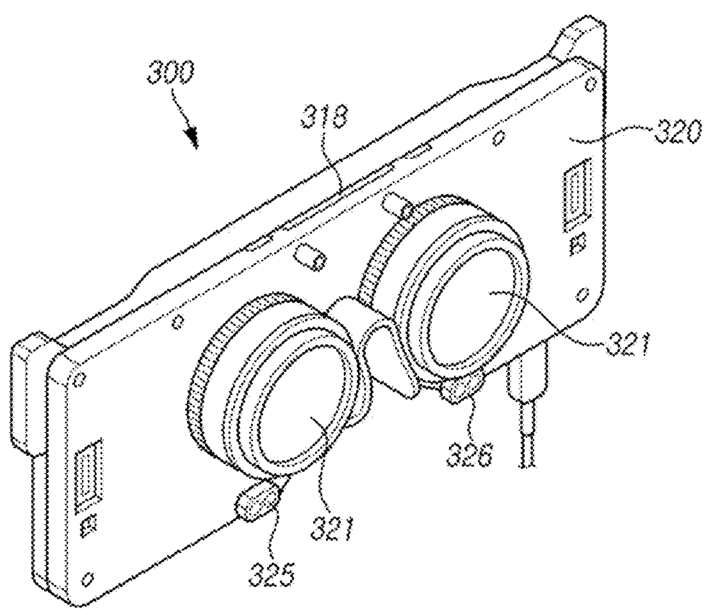
Figure 3C:
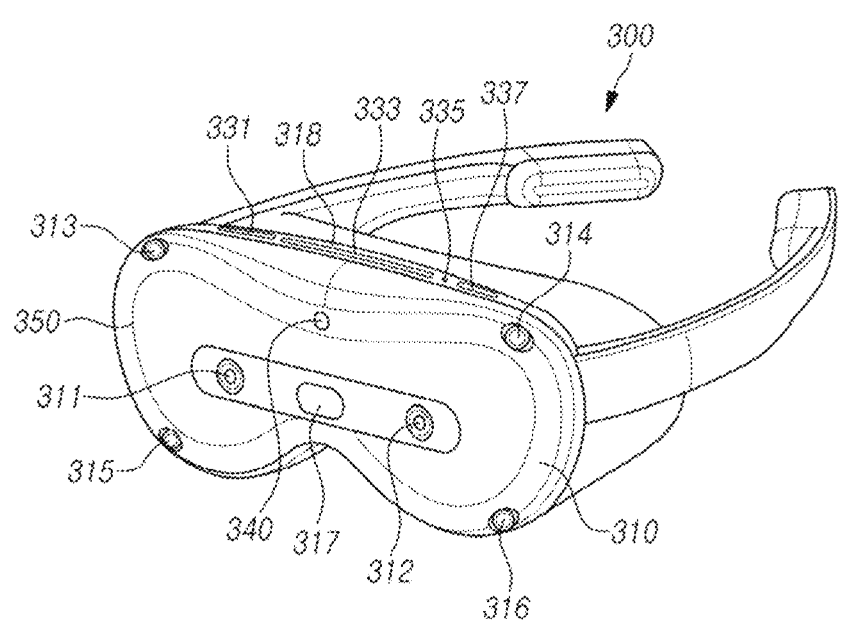

FIGS. 3A to 3C illustrate front and rear views of a wearable electronic device according to an embodiment of the disclosure.

The components and operations of the components described with reference to FIGS. 3A to 3C may be identical in whole or part to the components and operations of the components described with reference to FIGS. 1 and 2. The components and operations of the components described with reference to FIGS. 3A to 3C may be identical in whole or part to the components and operations of the components described with reference to FIGS. 4 to 14.

Referring to FIGS. 3A to 3C, according to an embodiment, the wearable electronic device 300 may include at least one first camera module 311 and 312, at least one second camera module 313, 314, 315, and 316, a depth sensor 317, a light emitter 340, and/or a second display 350. For example, in order to obtain information related to the surrounding environment of the wearable electronic device 300 (e.g., the electronic device 101 of FIG. 1), the at least one first camera module 311 and 312, the at least one second camera module 313, 314, 315, and 316, the depth sensor 317, the light emitter 340, and/or the second display 350 may be provided (or, disposed) on a first surface (or, side) 310 of the housing.

According to an embodiment, the at least one first camera module 311 and 312 may capture an external image of the wearable electronic device 300. For example, the first camera modules 311 and 312 may capture an image of an external environment in the front direction of the wearable electronic device 300.

According to an embodiment, at least one second camera module 313, 314, 315, and 316 may obtain an image while the wearable electronic device 300 is worn by the user. The second camera modules 313, 314, 315, and 316 may be used for hand detection, tracking, and recognition of the gesture of the user (e.g., hand gesture). The second camera modules 313, 314, 315, and 316 may be used for head tracking of 3DoF and 6DoF, location (e.g., space, environment) recognition, and/or movement recognition. According to an embodiment, the first camera modules 311 and 312 may be used for hand detection, tracking, and user gestures.

According to an embodiment, the depth sensor 317 may be configured to transmit a signal and receive a signal reflected from a subject and may be used to identify a distance to an object, such as time of flight (TOF). According to an embodiment, one or more of the second camera modules 313, 314, 315, and 316 may operate in conjunction with the depth sensor 317 to identify the distance to the object. For example, on behalf of or in addition to the depth sensor 317, the second camera module 313, 314, 315, and 316 may identify the distance to the object.

According to an embodiment, the light emitter 340 may emit light. For example, the light emitter 340 may emit light of at least one color (e.g., red, green and/or blue). The light emitter 340 may include, e.g., a LED, a laser light emitting device, an electroluminescent device, a plasma light emitting device, and/or a chemical light emitting device, but is not limited thereto. According to an embodiment, the light emitter 340 may be used to provide a notification indicating the operation state of the first camera modules 311 and 312. According to an embodiment, the light emitter 340 may provide a first notification indicating that the first camera modules 311 and 312 are activated by emitting light. For example, the light emitter 340 may provide a first notification indicating that the first camera modules 311 and 312 are activated by emitting light of a first color (e.g., red). According to an embodiment, the light emitter 340 may provide a second notification indicating that the first camera modules 311 and 312 are deactivated by not emitting light. According to an embodiment, the light emitter 340 may provide a second notification indicating that the first camera modules 311 and 312 are deactivated by emitting light of a second color (e.g., blue) different from the first color (e.g., red) for the first notification. Although the light emitter 340 is provided (or, disposed) at a position adjacent to the first camera modules 311 and 312 in FIGS. 3A and 3C, the disclosure is not limited thereto and may be configured at different positions according to the implementation of the wearable electronic device 300.

According to an embodiment, the second display 350 (and/or lens) may be provided (or, disposed) on the first surface (or, side) 310 of the wearable electronic device 300. According to an embodiment, the second display 350 may provide visual information to the outside of the wearable electronic device 300. For example, the second display 350 may be used on behalf of the light emitter 340 to provide an alternative notification indicating the operation state of the first camera modules 311 and 312.

According to an embodiment, face recognition camera modules 325 and 326 and/or a first display 321 (and/or lens) may be provided (or, disposed) on the second surface (or, side) 320 of the housing.

According to an embodiment, the face recognition camera modules 325 and 326 adjacent to the first display 321 may be used for recognizing a face of the user or may recognize and/or track both eyes of the user.

According to an embodiment, the first display 321 (and/or lens) may be provided (or, disposed) on the second surface (or, side) 320 of the wearable electronic device 300. According to an embodiment, the wearable electronic device 300 may not include camera modules 315 and 316 among the plurality of second camera modules 313, 314, 315, and 316. According to an embodiment, the wearable electronic device 300 may further include at least one of the components illustrated in FIG. 2 in addition to the components illustrated in FIGS. 3A and 3B.

Referring to FIG. 3C, according to an embodiment, the wearable electronic device 300 may have a form factor (e.g., a head-mounted display (HMD) for being worn on the head of the user. The wearable electronic device 300 may further include a strap and/or a wearing member to be fixed on a body part of the user. The wearable electronic device 300 may include a volume button 331, a vent 333, a status indicator 335, and a power button 337, and the components may be included in the wearable electronic device 300 illustrated in FIGS. 3A and 3B in the same manner. According to an embodiment, the power button may include a fingerprint recognition sensor. In another example, the fingerprint recognition sensor may be provide separate from the power button. While worn on the head of the user, it is possible to provide the user experience based on AR, virtual reality (VR), and/or extended reality (or mixed reality). The wearable electronic device 300 configured in the form of an HMD may include components identical or similar to the components of FIGS. 3A and 3B described above.

According to an embodiment, the speaker 318 (e.g., the sound output module 155 of FIG. 1 or the speaker 261 of FIG. 2) may output a sound signal (e.g., sound and/or virtual vibration sound). Although the speaker 318 is configured at a position adjacent to the vent 333 in FIGS. 3A to 3C, the disclosure is not limited thereto, and may be configured at different positions according to the implementation of the wearable electronic device 200.

Figure 4:
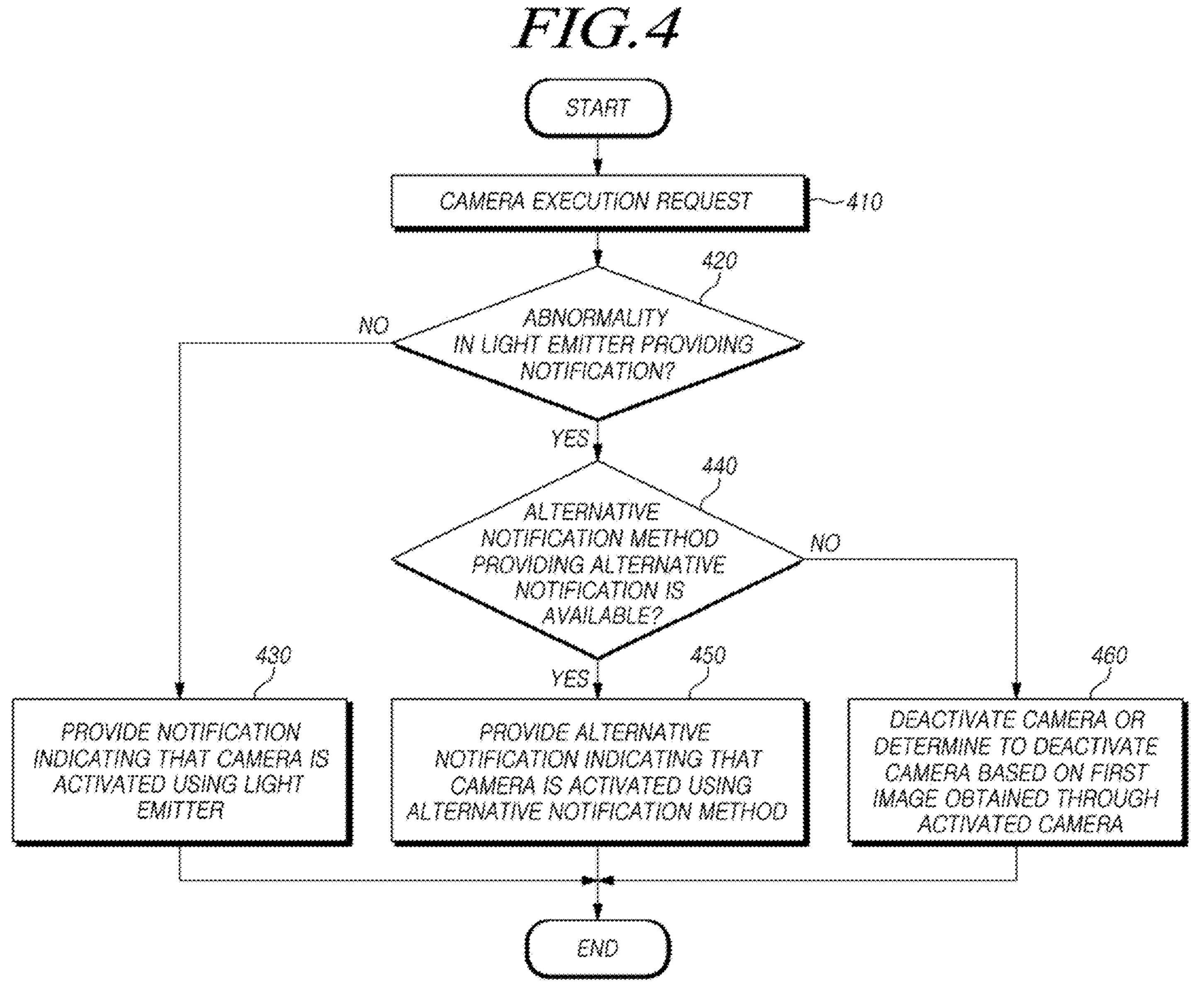
FIG. 4 is a flowchart illustrating operations for a wearable electronic device to provide a notification or an alternative notification indicating that a camera is activated according to an embodiment of the disclosure.

FIG. 4 is a flowchart illustrating operations for a wearable electronic device to provide a notification or an alternative notification indicating that a camera is activated according to an embodiment of the disclosure.

The components and operations of the components described with reference to FIG. 4 may be identical in whole or part to the components and operations of the components described with reference to FIGS. 1 to 3. The components and operations of the components described with reference to FIG. 4 may be identical in whole or part to the components and operations of the components described with reference to FIGS. 5 to 14.

Referring to FIG. 4, according to an embodiment, in operation 410, a wearable electronic device (e.g., the wearable electronic device 200 of FIG. 2 or the wearable electronic device 300 of FIGS. 3A to 3C) (e.g., an HMD device) may obtain (or receive) a camera execution request of a camera (e.g., the second camera module 253 of FIG. 2 or the first camera module 311 or 312 of FIGS. 3A to 3C). The camera execution request may be referred to as a camera execution command or a camera activation request/command. According to an embodiment, the camera may obtain (e.g., capture) an external image of the wearable electronic device. For example, the camera may capture an image of an external environment in the front direction of the wearable electronic device. In the disclosure, a camera to be executed in response to a camera execution request may be referred to as a first camera.

According to an embodiment, the wearable electronic device may obtain a camera execution request based on reception of a user input. For example, the wearable electronic device may obtain a camera execution request corresponding to a user input in response to receiving the user input (e.g., a user gesture input) requesting the camera to be executed. The user input may be obtained through, e.g., a second camera (e.g., the third camera module 255 of FIG. 2 or the second camera module 313, 314, 315, or 316 of FIGS. 3A and 3C).

According to an embodiment, the wearable electronic device may obtain a camera execution request based on the execution of the application. For example, the wearable electronic device may obtain a camera execution request corresponding to an application in response to the execution of the application using the camera.

According to an embodiment, the wearable electronic device may not activate the camera before performing operation 420 after the camera execution request is obtained. For example, the wearable electronic device may not immediately activate the camera even though a camera execution request is obtained. For example, the wearable electronic device may activate the camera based on identifying that there is no abnormality (e.g., problem or issue) in the light emitter (e.g., LED) providing the notification through operation 420 or based on identifying that an alternative notification method providing the alternative notification is available through operation 440. In other words, despite obtaining a camera execution request, the wearable electronic device may not activate the camera immediately but may activate the camera based on an availability of a notification or an alternative notification. For example, the notification or the alternative notification may indicate the operation state of the camera (e.g., active state). Herein, the term “abnormality” may mean, associated with, and/or be referred to as problem, issue, trouble, and alike, especially as it relates to the light emitter and related functions (e.g., non-functioning light emitter).

According to an embodiment, the wearable electronic device may activate the camera after the camera execution request is obtained and before performing operation 420. For example, the wearable electronic device may activate the camera based on or in response to obtaining the camera execution request. In an example case in which it is identified that there is an abnormality in the light emitter providing the notification through operation 420, and it is identified that an alternative notification method providing the alternative notification is not available through operation 440, the wearable electronic device may switch the activated camera to an inactive state. In other words, in an example case in which a camera execution request is obtained, the wearable electronic device may first activate the camera and then immediately deactivate the camera based on identifying that a notification and/or alternative notification indicating the operation state (e.g., active state) of the camera is not available.

Figure 13:
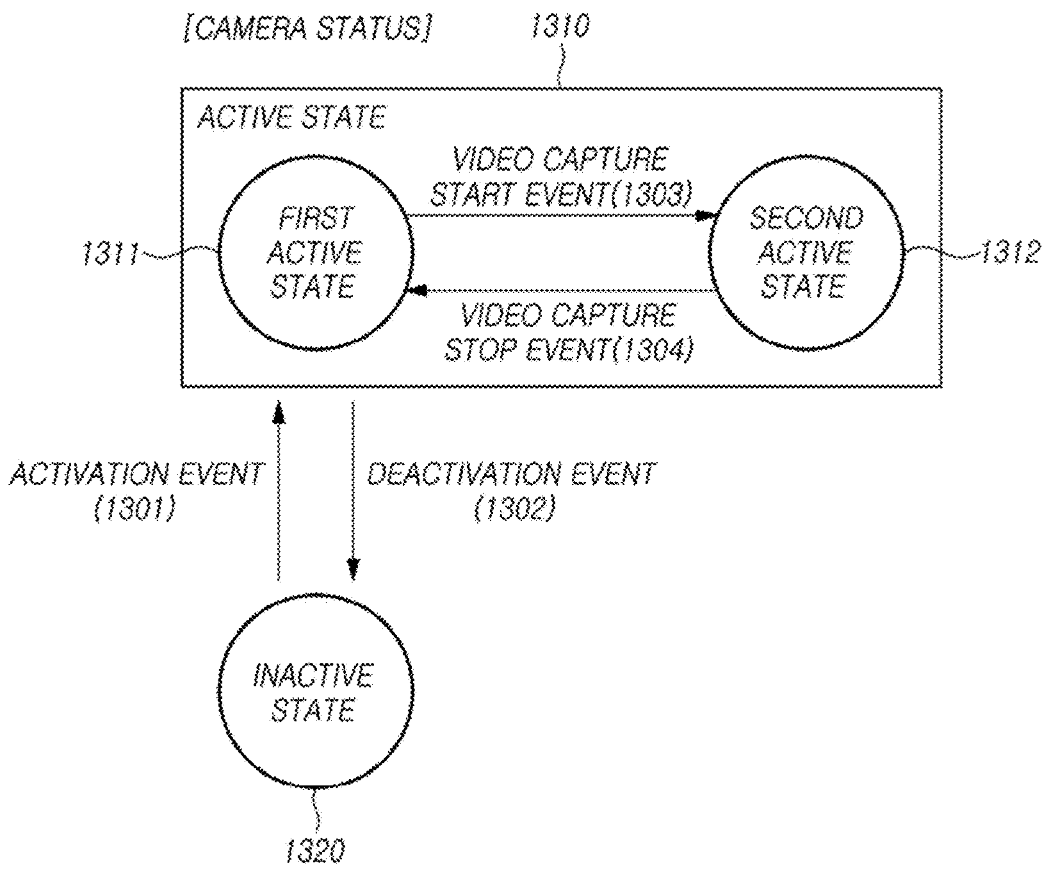
FIG. 13 is a view illustrating an example of a camera status according to an embodiment of the disclosure.

The following operations 420 to 460 may be performed in a state in which the camera is activated or in a state in which the camera is deactivated. Each state of the camera may be, for example, as illustrated in FIG. 13.

According to an embodiment, in operation 420, the wearable electronic device may identify (or determine) whether there is an abnormality in the light emitter (e.g., the light emitter 270 of FIG. 2 or the light emitter 340 of FIG. 3C) (e.g., an LED) providing the notification based on obtaining the request to execute the camera. For example, the wearable electronic device may identify (or determine) whether there is any abnormality in the light emitter. In an example case in which it is identified that there is no abnormality in the light emitter, operation 430 may be performed. In an example case in which it is identified that there is an abnormality in the light emitter, operation 440 may be performed. In the disclosure, an abnormality in the light emitter may include, but is not limited to, the light emitter not operating normally (e.g., failure in providing a notification normally). In an example case in which the light emitter fails to provide a notification normally due to at least one factor (e.g., a failure of the light emitter, an error of the light emitter, a fault of the light emitter, and/or a bug), the wearable electronic device may identify that there is an abnormality in the light emitter.

According to an embodiment, the light emitter may be used to provide a notification indicating an operation state of the camera. The operation state of the camera may include, but is not limited to, an active state indicating an activated state of the camera and/or an inactive state indicating a deactivated state of the camera. For example, the notification indicating the operation state of the camera may include a first notification indicating that the camera is activated and/or a second notification indicating that the camera is deactivated. In this manner, a person (e.g., a non-user or outside person) who does not wear the wearable electronic device may identify that the camera is in the active state through the first notification and may identify that the camera is in the inactive state through the second notification. Through the notification, the outside person may be aware that the camera is capturing them and/or the camera is storing an image captured of them.

According to an embodiment, the light emitter may provide a first notification indicating that the camera is activated by emitting light. For example, the light emitter may provide a first notification indicating that the camera is activated by emitting light of a first color (e.g., red). According to an embodiment, the light emitter may provide a second notification indicating that the camera is deactivated by not emitting light. According to an embodiment, the light emitter may provide a second notification indicating that the camera is deactivated by emitting light of a second color (e.g., blue) different from a first color (e.g., red) for the first notification.

According to an embodiment, the wearable electronic device may identify whether the light emitter has an abnormality based on the current of the light emitter through a sensor (e.g., a current sensor). For example, the wearable electronic device may identify that there is no abnormality in the light emitter based on the current flowing through the light emitter detected through the sensor being normal. For example, in a case in which the current flowing through the light emitter detected through the sensor is not normal, the wearable electronic device may identify that there is an abnormality in the light emitter. An example of an operation of determining an abnormality in the light emitter based on the current of the light emitter is described below with reference to FIG. 6.

According to an embodiment, the wearable electronic device may identify whether there is an abnormality in the light emitter based on a detection signal detected through at least one pin of a connector (e.g., interface 177 or connecting terminal 178 of FIG. 1) for connecting (e.g., electrical connection) the light emitter to at least one processor (or PBA including at least one processor) of the wearable electronic device. In an example case in which it is determined that the light emitter and at least one processor are connected normally through the connector based on the detection signal, the wearable electronic device may identify that there is no abnormality in the light emitter. In an example case in which it is determined that the light emitter and at least one processor are not connected normally through the connector based on the detection signal, the wearable electronic device may identify that there is an abnormality in the light emitter. According to an embodiment, the connector may be coupled to a printed circuit assembly including at least one processor. An example of an operation of determining an abnormality in the light emitter based on a detection signal of the connector is described below with reference to FIG. 7.

According to an embodiment, the wearable electronic device may identify whether there is an abnormality with the light emitter based on the light of the light emitter. For example, the wearable electronic device may use a light emitting detection device (e.g., the second camera module 253 or the second camera module 313, 314, 315, or 316 of FIG. 2, or sensor) to detect light emission to determine whether light is emitted from the light emitter and, in an example case in which it is identified that light is emitted from the light emitter, identify that there is no abnormality with the light emitter and, in an example case in which it is identified that light is not emitted from the light emitter, identify that there is an abnormality with the light emitter. According to an embodiment, the wearable electronic device may identify whether light is emitted from the light emitter using the light emitting detection device at a time when the light emitter is activated (hereinafter referred to as an activation time or on-timing) or after the activation time according to a camera execution request. The activation time of the light emitter may be, for example, a time after a designated period (e.g., 0.01 seconds) from the time when the camera execution request is obtained. A normal light emitter may initiate emitting light at the activation time. An example of an operation of determining an abnormality with the light emitter using the light emitting detection device is described below with reference to FIG. 8.

According to an embodiment, in operation 430, the wearable electronic device may provide a notification indicating that the camera is activated using the light emitter based on identifying that there is no abnormality with the light emitter. According to an embodiment, the wearable electronic device may provide a notification and display at least one first image obtained through the activated camera through a display (e.g., the display member 201 of FIG. 2 or the first display 321 of FIG. 3B). For example, the wearable electronic device may display at least one first image as a preview image through the display. The first image may include, but is not limited to, an image of an external environment in the front direction of the wearable electronic device captured through the camera.

According to an embodiment, the light emitter may provide a notification by emitting light indicating that the camera is activated. For example, the light emitter may emit light of the first color (e.g., red), thereby providing a notification indicating that the camera is activated.

According to an embodiment, the wearable electronic device may activate the camera from the inactive state based on identifying that there is no abnormality with the light emitter. For example, the wearable electronic device may switch the state of the camera from the inactive state to the active state in response to identifying that there is no abnormality with the light emitter. According to an embodiment, the wearable electronic device may maintain the camera in the active state based on identifying that there is no abnormality with the light emitter.

According to an embodiment, the activated camera may obtain (e.g., capture) an image of the external environment of the wearable electronic device. For example, the activated camera may capture an image of the external environment of the wearable electronic device in the front direction. The captured image may be displayed through the display. In the disclosure, the display on which the image captured by the camera is displayed may be referred to as a first display.

According to an embodiment, in operation 440, based on identifying that there is an abnormality with the light emitter, the wearable electronic device may identify whether an alternative notification method providing an alternative notification is available. In an example case which it is identified that the alternative notification method is available, operation 450 may be performed. In an example case which it is identified that the alternative notification method is not available, operation 460 may be performed.

According to an embodiment, the alternative notification may be a notification indicating the operation state (e.g., the active state of the camera) of the camera provided using the alternative notification method, instead of the notification indicating the operation state of the camera provided using the light emitter. According to an embodiment, the alternative notification method may include at least one of a first alternative notification method that visually provides an alternative notification through a second display (e.g., the second display 350 of FIG. 3C), a second alternative notification method that audibly provides an alternative notification through a speaker (e.g., the speaker 261 of FIG. 2 or the speaker 318 of FIGS. 3A to 3C), or a third alternative notification method that visually provides an alternative notification through a second camera module (e.g., the third camera module 255 of FIG. 2 or the second camera module 313, 314, 315, or 316 of FIGS. 3A and 3C).

According to an embodiment, in operation 450, the wearable electronic device may provide an alternative notification indicating that the camera is activated using the alternative notification method based on identifying that the alternative notification method is available. According to an embodiment, the wearable electronic device may provide an alternative notification and display at least one first image obtained through the activated camera through the display. The first image may include, but is not limited to, an image of the external environment in the front direction of the wearable electronic device.

According to an embodiment, the wearable electronic device may display visual information (e.g., an indicator) corresponding to the alternative notification through the second display using the first alternative notification method. For example, the wearable electronic device may display an indicator corresponding to the alternative notification in a partial area of the second display using the first alternative notification method. The color of the indicator corresponding to the alternative notification may be the same color as the first color (e.g., red) corresponding to the notification of the light emitter, but is not limited thereto.

According to an embodiment, the wearable electronic device may output a sound corresponding to the alternative notification through a speaker using the second alternative notification method. For example, the wearable electronic device may output a sound, such as "Camera is in active state" or "Camera is activated" using the second alternative notification method.

According to an embodiment, the wearable electronic device may emit light corresponding to the alternative notification through an LED (e.g., IR LED included in the second camera using the third alternative notification method. For example, the wearable electronic device may emit light of a color corresponding to the alternative notification by increasing the power of the IR LED included in the second camera using the third alternative notification method. The color corresponding to the alternative notification may be the same color as the first color (e.g., red) corresponding to the notification of the light emitter, but is not limited thereto.

According to an embodiment, the wearable electronic device may activate the camera from the inactive state based on identifying that an alternative notification method is available. For example, the wearable electronic device may switch the state of the camera from the inactive state to the active state in response to identifying that an alternative notification method is available. According to an embodiment, the wearable electronic device may maintain the camera in the active state based on identifying that the alternative notification method is available.

According to an embodiment, the activated camera may capture an image of the external environment (e.g., surroundings) of the wearable electronic device. For example, the activated camera may capture an image of the external environment of the wearable electronic device in the front direction. The captured image may be displayed through the display.

According to an embodiment, in operation 460, the wearable electronic device may perform a camera deactivation operation (operation 1) or a camera deactivation determination operation (operation 2) based on identifying that the alternative notification method is not available.

According to an embodiment, the camera deactivation operation (operation 1) may include an operation of deactivating the camera in the active state or an operation of maintaining the camera in the inactive state. In an example case in which an alternative notification method is not available, the wearable electronic device may perform the camera deactivation operation to prevent an image from being obtained (e.g., captured) through the camera. Through the camera deactivation operation, the wearable electronic device may not capture an image through the camera in a state where notification and/or alternative notification may not be provided. For example, since other people may be present in the external environment of the wearable electronic device in the front direction, there is a risk of invasion of other people's privacy (e.g., invasion of privacy due to illegal photographing) in an example case in which an image is captured through a camera without providing a notification or alternative notification of the camera's activation state (capturing state). Therefore, in a state where a notification or alternative notification may not be provided, the camera may be deactivated through the camera deactivation operation described above, so that an image may not be captured.

However, even when a notifications or alternative notification may not be provided, it may be necessary to maintain the camera in the active state for a specific purpose (e.g., to secure visibility for the safety of the user wearing the wearable electronic device). To that end, instead of the above-described camera deactivation operation, a camera deactivation determination operation to be described below may be performed.

According to an embodiment, the camera deactivation determination operation (operation 2) may include, but is not limited to, an operation of determining whether to deactivate the activated camera based on the first image obtained through the activated camera. In an example case in which an alternative notification method is not available, the wearable electronic device may determine whether to deactivate the camera by performing the camera deactivation determination operation, and based on determining to deactivate the camera, deactivate the camera to prevent an image from being captured through the camera, and based on determining to activate the camera, maintain the camera in the active state to allow an image to be continuously captured through the camera. Through the camera deactivation determination operation, the wearable electronic device may capture an image through the camera when necessary, even in a state where notification and/or alternative notification may not be provided. As described above, even when a notification or alternative notification may not be provided, it may be necessary to maintain the camera in the active state for a specific purpose wearing the wearable electronic device. Therefore, even when a notification or alternative notification may not be provided, the wearable electronic device may maintain the camera in the active state or deactivate the camera according to the situation through the above-described camera deactivation determination operation rather than immediately deactivating the camera. An example of the camera deactivation determination operation is described below with reference to FIGS. 5A and 5B.

Figure 5A:
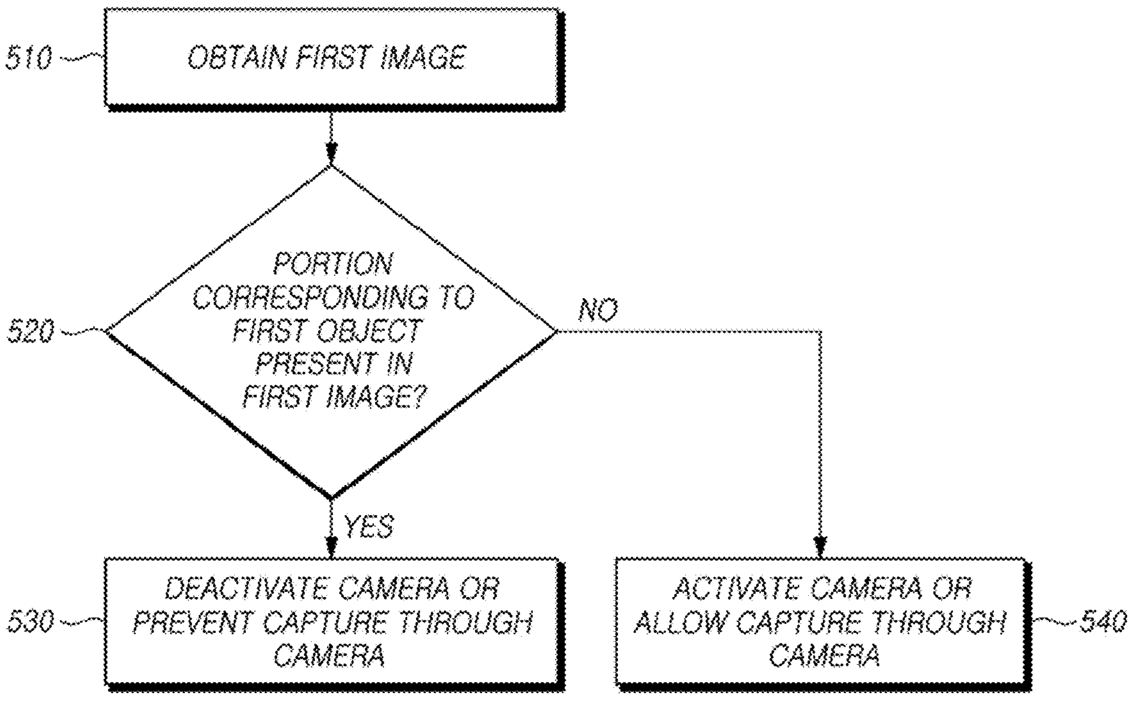
FIG. 5A is a flowchart illustrating operations for a wearable electronic device to determine whether to deactivate a camera based on a captured image according to an embodiment of the disclosure.

FIG. 5A is a flowchart illustrating operations for a wearable electronic device to determine whether to deactivate a camera based on a captured image according to an embodiment of the disclosure.

Figure 5B:
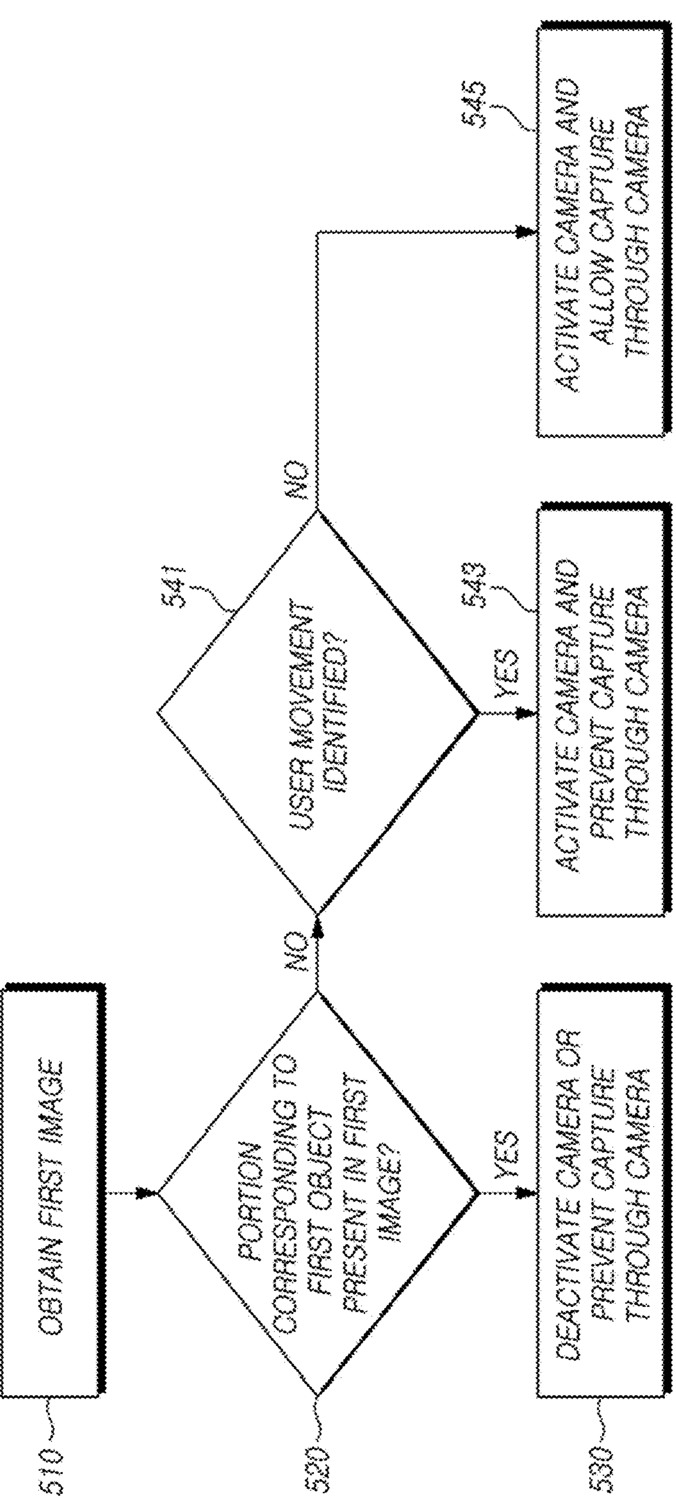
FIG. 5B is a flowchart illustrating operations for a wearable electronic device to determine whether to deactivate a camera based on a captured image and identification of a movement of a user according to an embodiment of the disclosure.

FIG. 5B is a flowchart illustrating operations for a wearable electronic device to determine whether to deactivate a camera based on a captured image and identification of a movement of a user according to an embodiment of the disclosure.

The components and operations of the components described with reference to FIGS. 5A and 5B may be identical in whole or part to the components and operations of the components described with reference to FIGS. 1 to 4. The components and operations of the components described with reference to FIGS. 5A and 5B may be identical in whole or part to the components and operations of the components described with reference to FIGS. 6 to 14.

According to an embodiment, at least one of the operations of FIGS. 5A and 5B may be performed in an example case in which a notification and/or an alternative notification indicating that the first camera is activated may not be provided. For example, at least one of the operations of FIGS. 5A and 5B may be performed in an example case in which it is identified that the light emitter that provides a notification has an abnormality through operation 420 of FIG. 4, and it is identified that an alternative notification method that provides an alternative notification is not available through operation 440 of FIG. 4.

Referring to FIG. 5A, according to an embodiment, in operation 510, the wearable electronic device (e.g., the wearable electronic device 200 of FIG. 2 or the wearable electronic device 300 of FIGS. 3A and 3B) (e.g., an HMD device) may obtain a first image.

According to an embodiment, the first image may include an image of the external environment surrounding the wearable electronic device. For example, the first image may include the external environment in the front direction of the wearable electronic device captured through a camera (e.g., the second camera module 253 of FIG. 2 or the first camera module 311 or 312 of FIGS. 3A and 3B). In the example of FIG. 5A, the camera that captures the first image may be referred to as a first camera.

According to an embodiment, in operation 520, the wearable electronic device may identify whether a portion corresponding to a first object is present (e.g., shown) (or, included) in the first image. In an example case in which it is identified that the portion corresponding to the first object is present (or included) in the first image, operation 530 may be performed. In an example case in which it is identified that the portion corresponding to the first object is not present (or not included) in the first image, operation 540 may be performed.

According to an embodiment, the first object may be an object that should not be captured through a camera without a notification or an alternative notification. For example, the first object may be a person (or a figure) or a portion (e.g., face or head) of the person (or the figure). For example, the person associated with the first object may be a person different from the user of the wearable electronic device. According to an embodiment, the first object may be a building or object to be confidential. Hereinafter, for convenience of description, it is described as an example that the first object is a person.

According to an embodiment, in operation 530, the wearable electronic device may deactivate the camera or prevent the capture and/or storage of an image (e.g., video) through the camera based on identifying that the portion corresponding to the first object is present (e.g., included) in the first image. For example, the wearable electronic device may prohibit a capture of an image (e.g., a video). For example, when a portion corresponding to another person is present (e.g., included) in the first image captured through the camera (e.g., the first image of the external environment of the wearable electronic device in the front direction), there is a risk of invasion of the other person's privacy when the image is captured and/or stored through the first camera without providing a notification or alternative notification. Therefore, the wearable electronic device needs to control the camera to resolve concerns about the invasion of other people's privacy.

According to an embodiment, the wearable electronic device may deactivate the camera based on (or in response to) identifying that the portion corresponding to the first object is present (e.g., included) in the first image. As such, the deactivated camera may not capture an image. According to an embodiment, the wearable electronic device may prevent an image from being captured through a camera to protect the privacy of another person. The wearable electronic device according to this embodiment may include a first type of wearable electronic device (e.g., the wearable electronic device 200 of FIG. 2) capable of securing a visibility of the user even when the wearable electronic device does not display an image captured through the first camera, but is not limited thereto. The first type of wearable electronic device may include, but is not limited to, a wearable electronic device that provides an AR function.

According to an embodiment, the wearable electronic device may maintain the camera in the active state based on (or in response) to identifying that the portion corresponding to the first object is present (e.g., included) in the first image, but may prevent the capture and/or storage of an image (e.g., a video) through the camera. According to this embodiment, the wearable electronic device may display an image obtained (e.g., captured) through a camera through a display (e.g., the display member 201 of FIG. 2 or the first display 321 of FIG. 3B) to secure the visibility of the user of the wearable electronic device, but may prevent the capture and storage of an image in the form of a video to protect the privacy of others. The wearable electronic device according to this embodiment may include a second type of wearable electronic device (e.g., the wearable electronic device 300 of FIGS. 3A to 3C) in which the user wearing the wearable electronic device may not secure visibility when there is no display of an image captured through a camera, but is not limited thereto. The second type of wearable electronic device may include, but is not limited to, a wearable electronic device that provides a VR/VST function.

According to an embodiment, an operation of preventing an image (e.g., a video) from being captured through a camera may include, but is not limited to, an operation of stopping (e.g., disable or turn-off) the image (e.g., video) capture (e.g., capture function) currently being executed through a camera. In an example case in which image capture is stopped (e.g., disabled or turned-off), the image (e.g., an existing video) captured before the stop may be stored or may not be stored according to a selection of the user.

According to an embodiment, in operation 540, the wearable electronic device may maintain the camera in the active state and allow an image (e.g., a video) to be captured and/or stored through the camera based on identifying that the portion corresponding to the first object is not present (e.g., included) in the first image. For example, when the first image captured through the camera (e.g., the first image of the external environment in the front direction of the wearable electronic device) does not include the portion corresponding to another person which is the first object, there is no concern about invasion of other people's privacy even when the image is captured through the camera without providing a notification or alternative notification. Therefore, even when a notification or alternative notification is not provided, it is not required to deactivate the first camera.

According to an embodiment, the wearable electronic device may maintain the camera in the active state and allow an image (e.g., a video) to be captured and/or stored through the camera based on (or in response to) identifying that the portion corresponding to the first object is not present (e.g., included) in the first image. The wearable electronic device according to this embodiment may not only display an image captured through a camera to secure the visibility of the user of the wearable electronic device but may also allow an image to be captured and stored in the form of a video.

According to an embodiment, an operation of allowing an image (e.g., a video) to be captured through a camera may include, but is not limited to, an operation of maintaining the image (e.g., video) capture currently being executed through a camera and/or an operation of storing a captured image (e.g., a video).

In the embodiment of FIG. 5B, which is described below, unlike the embodiment of FIG. 5A, after it is identified that the portion corresponding to the first object is not present (e.g., included) in the first image through operation 520, operations of identifying a movement of the user of the wearable electronic device and allowing or preventing mage (e.g., video) capture and/or storage through a camera according to the result of identifying the movement of the user may be performed.

Referring to FIG. 5B, according to an embodiment, in operation 510, a wearable electronic device (e.g., the wearable electronic device 200 of FIG. 2 or the wearable electronic device 300 of FIGS. 3A and 3B) (e.g., an HMD device) may obtain (e.g., capture) a first image. Operation 510 of FIG. 5B may be the same as operation 510 of FIG. 5A.

According to an embodiment, in operation 520, the wearable electronic device may identify whether a portion corresponding to a first object is present (e.g., included) in the first image. In an example case in which it is identified that the portion corresponding to the first object is present (e.g., included) in the first image, operation 530 may be performed. In an example case in which it is identified that the portion corresponding to the first object is not present (e.g., included) in the first image, operation 541 may be performed in the wearable electronic device. Operation 520 of FIG. 5B may be the same as operation 520 of FIG. 5A.

According to an embodiment, in operation 530, the wearable electronic device may deactivate the first camera or may prevent the capture and/or storage of an image (e.g., a video) through the first camera based on identifying that the portion corresponding to the first object is present (e.g., included) in the first image. Operation 530 of FIG. 5B may be the same as operation 530 of FIG. 5A.

According to an embodiment, in operation 541, the wearable electronic device may determine whether a movement of the user of the wearable electronic device is identified based on identifying that the portion corresponding to the first object is not present (e.g., included) in the first image. In an example case in which the user movement is identified, operation 543 may be performed. In an example case in which the user movement is not identified, operation 545 may be performed. According to an embodiment, the wearable electronic device may determine whether a movement of the user of the wearable electronic device is identified based on sensing data obtained through at least one sensor (e.g., an acceleration sensor, a 6-axis sensor). According to an embodiment, the wearable electronic device may determine a movement of the wearable electronic device based on sensing data obtained through at least one sensor (e.g., an acceleration sensor, a 6-axis sensor). For example, in operation 441, the method may include determining whether the wearable electronic device is moving based on sensing data obtained through the at least one sensor.

According to an embodiment, when it is identified that the portion corresponding to the first object is not present (e.g., included) in the first image, e.g., after performing operation 540 of FIG. 5A, the wearable electronic device may perform operation 541. In other words, operation 540 may be performed before operation 541.

According to an embodiment, the wearable electronic device may determine whether a movement of the user wearing the wearable electronic device is identified based on at least one image obtained through the second camera (e.g., the third camera module 255 of FIG. 2 or the second camera module 313, 314, 315, or 316 of FIGS. 3A and 3C). According to an embodiment, the wearable electronic device may determine whether a movement of the user wearing the wearable electronic device is identified based on sensing data obtained through at least one sensor (e.g., an acceleration sensor, a 6-axis sensor).

As described above, in an example case in which the first image captured through the camera (e.g., the first image of the external environment in the front direction of the wearable electronic device) does not include a portion corresponding to another person who is the first object, there is no concern about invasion of other people's privacy even when the image is captured and/or stored through the camera without providing a notification or alternative notification. Therefore, even when a notifications or alternative notification is not provided, there is no need to deactivate the camera. However, even in this case, when the movement of the user occurs and the location and/or direction captured through the camera is changed, there is a possibility that there may be another person in the changed location and/or direction, which may lead to the risk of invasion of other people's privacy again. Therefore, measures are needed to address the issues.

According to an embodiment, in operation 543, based on identifying the movement of the user, the wearable electronic device may maintain the camera in the active state but may prevent an image (e.g., a video) from being captured and/or stored through the camera. For example, in response to identifying the movement of the user, the wearable electronic device may maintain the camera in the active state but prevent the video from being captured and/or stored through the camera. The wearable electronic device according to this embodiment may display an image captured through a camera through a display in order to secure the visibility of the user of the wearable electronic device. However, as described above, the location and/or direction captured through the first camera is changed according to the movement of the user, and another person may be present in the changed location and/or direction, which may infringe on the privacy of others. Therefore, the wearable electronic device may prevent an image from being captured and stored in the form of an image (e.g., a video) to protect the privacy of others.

According to an embodiment, an operation of preventing an image (e.g., a video) from being captured through a camera may include, but is not limited to, an operation of stopping (e.g., disable or turn-off) the image (e.g., video) capture (e.g., capture function) currently being executed through a camera. In an example case in which capturing of the image is stopped (e.g., disabled or turned-off), an image (e.g., an existing video) captured before stopping capture may be stored or may not be stored.

According to an embodiment, in operation 545, based on the movement of the user not being identified, the wearable electronic device may maintain the camera in the active state and allow an image (e.g., a video) to be captured and/or stored through the camera. For example, in response to the movement of the user not being identified, the wearable electronic device may maintain the camera in the active state and allow video to be captured and/or stored through the camera. The wearable electronic device according to this embodiment may not only display an image captured through a camera to secure the visibility of the user of the wearable electronic device but may also allow an image to be captured and stored in the form of an image (e.g., a video) because there is no concern about invasion of other people's privacy.

According to an embodiment, an operation of allowing an image (e.g., a video) to be captured through a camera may include, but is not limited to, an operation of maintaining the image (e.g., video) capture currently being executed through a camera and/or an operation of storing a captured image (e.g., a video).

Figure 6:
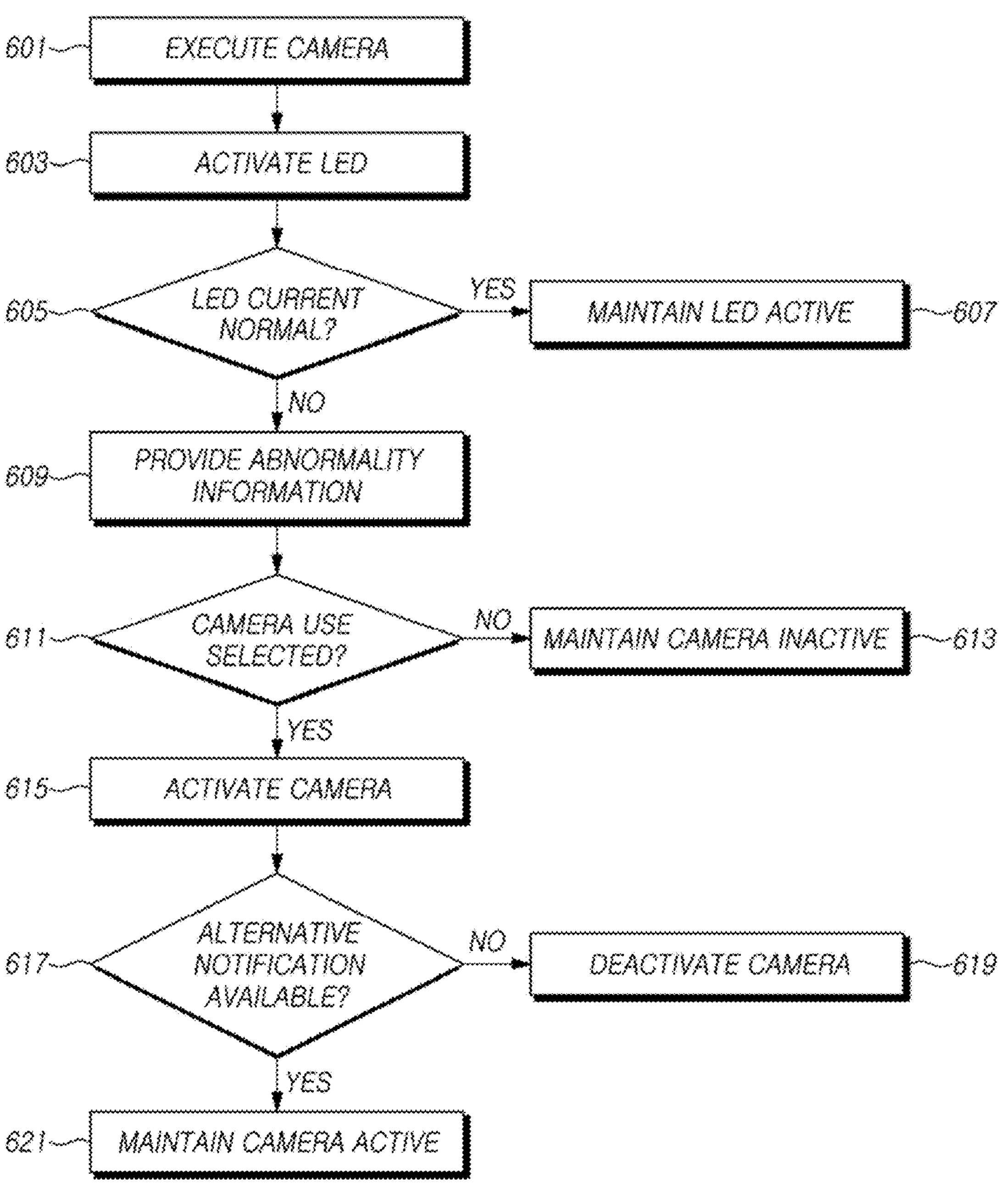
FIG. 6 is a view illustrating a camera status and an operation for a wearable electronic device to identify an abnormality in an LED based on a current of the LED according to an embodiment of the disclosure.
Figure 7:
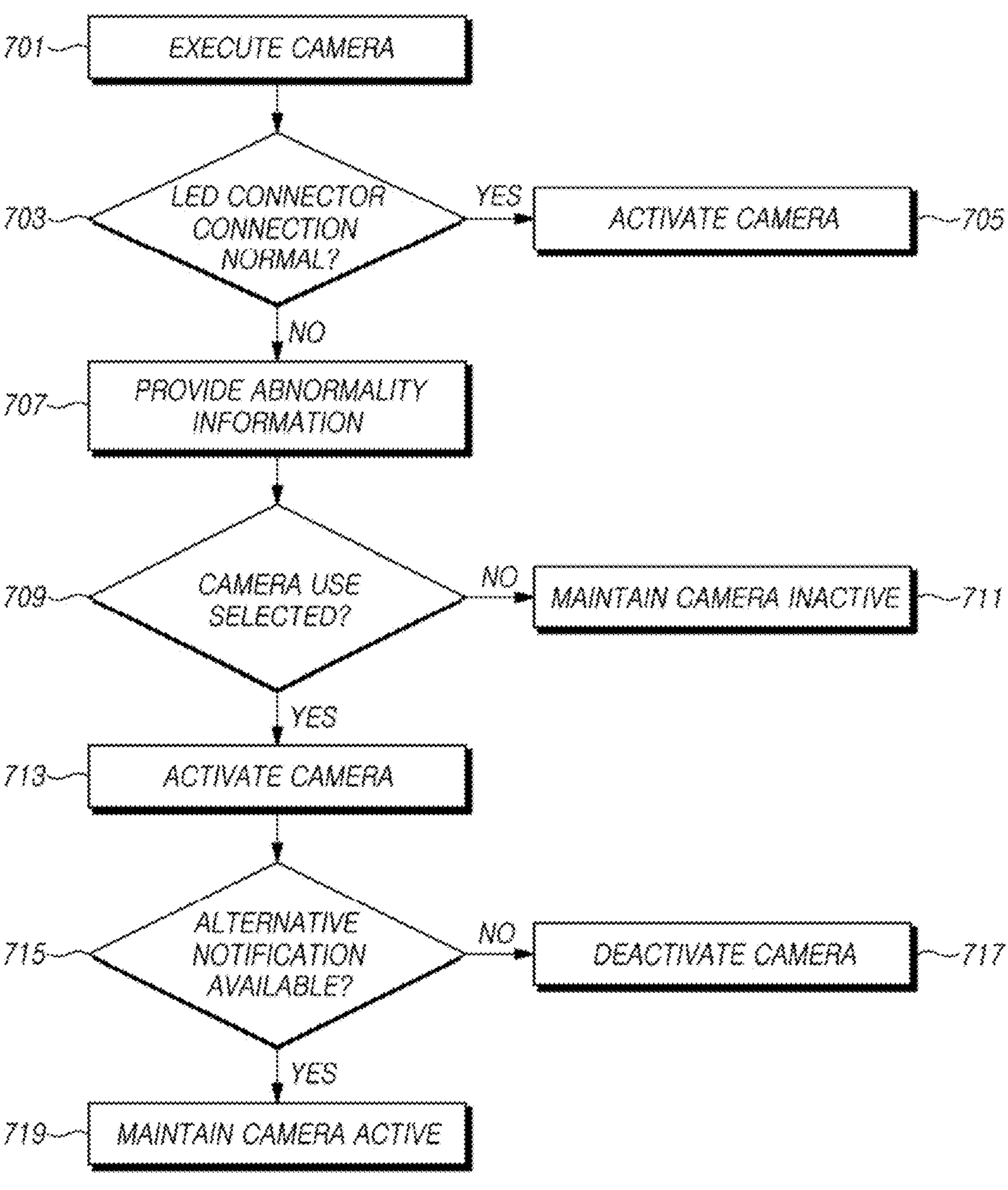
FIG. 7 is a view illustrating a camera status and an operation for a wearable electronic device to identify an abnormality in an LED based on a connector connection state of the LED according to an embodiment of the disclosure.
Figure 8:
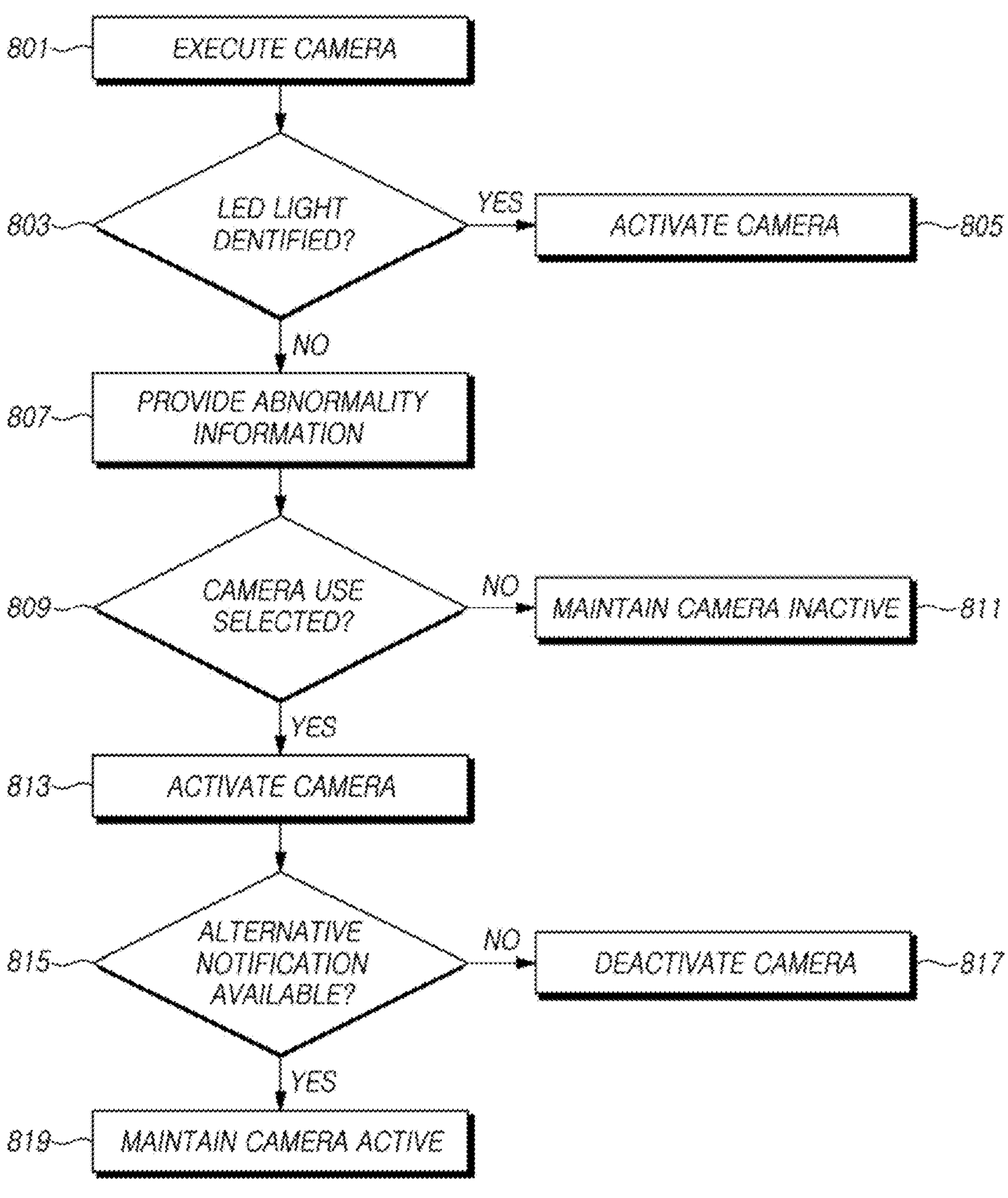
FIG. 8 is a view illustrating a camera status and an operation for a wearable electronic device to identify an abnormality in an LED based on light of the LED according to an embodiment of the disclosure.

Hereinafter, various examples of operations in which the wearable electronic device identifies whether there is an abnormality with the light emitting device or the light emitter are described with reference to FIGS. 6 to 8. In the embodiments of FIGS. 6 to 8, for convenience of description, it is exemplified that the light emitter is an LED, but the disclosure is not limited thereto. For example, the descriptions of FIGS. 6 to 8 may be equally applied to other types of light emitters.

FIG. 6 is a view illustrating a camera status and an operation for a wearable electronic device to identify an abnormality in an LED based on a current of the LED according to an embodiment of the disclosure.

The components and operations of the components described with reference to FIG. 6 may be identical in whole or part to the components and operations of the components described with reference to FIGS. 1 to 5. The components and operations of the components described with reference to FIG. 6 may be identical in whole or part to the components and operations of the components described with reference to FIGS. 7 to 14.

Referring to FIG. 6, according to an embodiment, an LED may be used as a light emitter (e.g., the light emitter 270 of FIG. 2 or the light emitter 340 of FIG. 3C) for providing a notification of the operation state of the camera.

According to an embodiment, in operation 601, a wearable electronic device (e.g., the wearable electronic device 200 of FIG. 2 or the wearable electronic device 300 of FIGS. 3A and 3B) (e.g., an HMD device) may execute a camera (e.g., the second camera module 253 of FIG. 2 or the first camera module 311 or 312 of FIGS. 3A and 3C). The execution operation of the camera in operation 601 may include, but is not limited to, an operation of obtaining a camera execution request of the camera in operation 410. In the embodiment of FIG. 6, for convenience of description, it is described as an example that the camera is activated through the execution operation of the camera.

According to an embodiment, in operation 602, the wearable electronic device may activate the LED. For example, the wearable electronic device may activate the LED to provide a notification indicating that the camera is activated based on the camera execution request. The activated LED may emit light of a designated color (e.g., red), thereby providing a notification indicating that the camera is activated.

According to an embodiment, in operation 603, the wearable electronic device may identify whether the current of the LED is normal. In an example case in which it is identified that the LED current is normal, operation 607 may be performed. In an example case in which it is identified that the LED current is not normal, operation 608 may be performed.

According to an embodiment, the wearable electronic device may obtain (or detect) a current flowing through the LED through a sensor (e.g., a current sensor) and compare it with a normal current to identify whether the LED current is normal.

According to an embodiment, in operation 607, the wearable electronic device may maintain the active state of the LED based on identifying that the LED current is normal. The wearable electronic device may identify that the LED is normally activated based on identifying that the LED current is normal. In this case, the wearable electronic device may identify that there is no abnormality with the LED (e.g., light emitter) and maintain the active state of the LED. Accordingly, the notification indicating that the camera is activated may be continuously provided through the LED.

According to an embodiment, in operation 609, the wearable electronic device may provide abnormality information and deactivate the camera based on identifying that the LED current is not normal. The wearable electronic device may identify that the LED is not normally activated based on identifying that the LED current is not normal. In this case, the wearable electronic device may identify that there is an abnormality with the LED, provide abnormality information for indicating that there is an abnormality with the LED, and deactivate the camera.

According to an embodiment, the abnormality information may include information for indicating that there is an abnormality with the LED and/or information for inquiring the user about use of the camera. An example of a screen including the information is described below with reference to FIG. 11.

According to an embodiment, in operation 611, the wearable electronic device may identify whether the use of the camera is selected. In an example case in which it is identified that the use of the camera is selected, operation 615 may be performed. In an example case in which it is identified that the use of the camera is not selected, operation 613 may be performed.

According to an embodiment, the wearable electronic device may identify whether the use of the camera is selected based on a user input. For example, the wearable electronic device may identify whether the use of the camera is selected based on a user input (e.g., user gesture input) through abnormality information.

According to an embodiment, in operation 613, the wearable electronic device may maintain the inactive state of the camera based on identifying that use of the camera is not selected. In an example case in which there is an abnormality with the LED providing a notification as described above, and the user does not wish to use the camera, the wearable electronic device may continue to maintain the camera in the inactive state.

According to an embodiment, in operation 615, the wearable electronic device may activate the camera based on identifying that the use of the camera is selected. Even though there is an abnormality with the LED providing a notification, the user may wish to use the camera. In this case, the user may select the use of the camera through a user input, and the wearable electronic device may activate the camera according to a user input of selecting the use of the camera.

According to an embodiment, in operation 617, the wearable electronic device may identify whether an alternative notification is available. For example, the wearable electronic device may identify whether an alternative notification method that provides an alternative notification is available by identifying whether an alternative notification method is available. For example, operation 617 may include operation 440 of FIG. 4. As an example of an alternative notification method and a description of providing an alternative notification using the alternative notification method, the description of operation 440 of FIG. 4 may apply. In an example case in which it is identified that the alternative notification is not available, operation 619 may be performed. In an example case in which it is identified that the alternative notification is available, operation 621 may be performed.

According to an embodiment, in operation 619, the wearable electronic device may deactivate the camera based on identifying that the alternative notification is not available. As such, in an example case in which there is an abnormality with the LED providing a notification and an alternative notification is not available, the wearable electronic device may deactivate the camera to protect other people's privacy even if the user wishes to use the camera.

According to an embodiment, in operation 621, the wearable electronic device may maintain the camera in the active state based on identifying that the alternative notification is not available. As such, in an example case in which there is an abnormality with the LED providing a notification, but an alternative notification is available, the wearable electronic device may activate the camera and provide an alternative notification indicating that the camera is activated through an alternative notification method.

FIG. 7 is a view illustrating a camera status and an operation for a wearable electronic device to identify an abnormality in an LED based on a connector connection state of the LED according to an embodiment of the disclosure.

The components and operations of the components described with reference to FIG. 7 may be identical in whole or part to the components and operations of the components described with reference to FIGS. 1 to 6. The components and operations of the components described with reference to FIG. 7 may be identical in whole or part to the components and operations of the components described with reference to FIGS. 8 to 14.

Referring to FIG. 7, according to an embodiment, an LED may be used as a light emitter (e.g., the light emitter 270 of FIG. 2 or the light emitter 340 of FIG. 3C) for providing a notification of the operation state of the camera.

According to an embodiment, in operation 701, a wearable electronic device (e.g., the wearable electronic device 200 of FIG. 2 or the wearable electronic device 300 of FIGS. 3A to 3B) (e.g., an HMD device) may execute a camera (e.g., the second camera module 253 of FIG. 2 or the first camera module 311 or 312 of FIGS. 3A and 3C). The execution operation of the camera in operation 701 may include, but is not limited to, an operation of obtaining a camera execution request of the camera in operation 410. In the embodiment of FIG. 7, for convenience of description, it is described as an example that the camera is not activated before operation 703.

According to an embodiment, in operation 703, the wearable electronic device may identify whether a connector for connecting (e.g., electrical connection) the LED to at least one processor of the wearable electronic device is normal. In an example case in which it is identified that the connector connection is normal, operation 705 may be performed. In an example case in which it is identified that the connector connection is not normal, operation 707 may be performed.

According to an embodiment, the wearable electronic device may identify whether the connector connection is normal based on a detection signal detected through at least one pin of the connector. For example, when the detection signal satisfies (or meets) a designated condition (e.g., a normal signal condition), the wearable electronic device may identify that the connector connection is normal. In this case, the wearable electronic device may identify that the LED and at least one processor are normally connected through the connector and identify that there is no abnormality with the LED. For example, the wearable electronic device may identify that the connector connection is not normal if the detection signal does not satisfy (or meet) the designated condition. In this case, the wearable electronic device may identify that the LED and at least one processor are not normally connected through the connector and identify that there is an abnormality with the LED.

According to an embodiment, in operation 705, the wearable electronic device may activate the camera based on identifying that the connector connection is normal. The wearable electronic device may identify that there is no abnormality with the LED based on identifying that the connector connection is normal. In this case, the wearable electronic device may activate the camera and provide a notification indicating that the camera is activated through the activated LED.

According to an embodiment, in operation 707, the wearable electronic device may provide abnormality information based on identifying that the connector connection is not normal. The wearable electronic device may identify that there is an abnormality with the LED based on identifying that the connector connection is not normal. Accordingly, the wearable electronic device may provide abnormality information for indicating that there is an abnormality with the LED.

According to an embodiment, the abnormality information may include first information indicating that there is an abnormality with the LED and/or second information inquiring the user about the use of the camera. An example of a screen including the information is described below with reference to FIG. 11.

According to an embodiment, in operation 709, the wearable electronic device may identify whether the use of the camera is selected. In an example case in which it is identified that the use of the camera is not selected, operation 711 may be performed. In an example case in which it is identified that the use of the camera is selected, operation 713 may be performed.

According to an embodiment, the wearable electronic device may identify whether the use of the camera is selected based on a user input. For example, the wearable electronic device may identify whether the use of the camera is selected based on a user input (e.g., user gesture input) through abnormality information.

According to an embodiment, in operation 711, the wearable electronic device may maintain the inactive state of the camera based on identifying that use of the camera is not selected. In an example case in which there is an abnormality with the LED providing a notification as described above, and the user does not wish to use the camera, the wearable electronic device may continue to maintain the camera in the inactive state.

According to an embodiment, in operation 713, the wearable electronic device may activate the camera based on identifying that the use of the camera is selected. Even though there is an abnormality with the LED providing a notification, the user may wish to use the camera. In this case, the user may select the use of the camera through a user input, and the wearable electronic device may activate the camera according to a user input of selecting the use of the camera.

According to an embodiment, in operation 715, the wearable electronic device may identify whether an alternative notification is available. For example, the wearable electronic device may identify whether an alternative notification method that provides an alternative notification is available by identifying whether an alternative notification method is available. Operation 715 may include, but is not limited to, operation 440 of FIG. 4. As an example of an alternative notification method and a description of providing an alternative notification using the alternative notification method, the description of operation 440 of FIG. 4 may apply. In an example case in which it is identified that the alternative notification is not available, operation 717 may be performed. In an example case in which it is identified that the alternative notification is available, operation 719 may be performed.

According to an embodiment, in operation 717, the wearable electronic device may deactivate the camera based on identifying that the alternative notification is not available. As such, in an example case in which there is an abnormality with the LED providing a notification and an alternative notification is not available, the wearable electronic device may deactivate the camera to protect other people's privacy even when the user wishes to use the camera.

According to an embodiment, in operation 719, the wearable electronic device may maintain the camera in the active state based on identifying that the alternative notification is not available. As such, in an example case in which there is an abnormality with the LED providing a notification, but an alternative notification is available, the wearable electronic device may activate the camera and provide an alternative notification indicating that the camera is activated through an alternative notification method.

FIG. 8 is a view illustrating a camera status and an operation for a wearable electronic device to identify an abnormality in an LED based on light of the LED according to an embodiment of the disclosure.

The components and operations of the components described with reference to FIG. 8 may be identical in whole or part to the components and operations of the components described with reference to FIGS. 1 to 7. The components and operations of the components described with reference to FIG. 8 may be identical in whole or part to the components and operations of the components described with reference to FIGS. 9 to 14.

Referring to FIG. 8, according to an embodiment, an LED may be used as a light emitter (e.g., the light emitter 270 of FIG. 2 or the light emitter 340 of FIG. 3C) for providing a notification of the operation state of the camera.

According to an embodiment, in operation 801, a wearable electronic device (e.g., the wearable electronic device 200 of FIG. 2 or the wearable electronic device 300 of FIGS. 3A and 3B) (e.g., an HMD device) may execute a camera (e.g., the second camera module 253 of FIG. 2 or the first camera module 311 or 312 of FIGS. 3A and 3C). The execution operation of the camera in operation 801 may include, but is not limited to, an operation of obtaining a camera execution request of the camera in operation 410. In the embodiment of FIG. 8, for convenience of description, it is described as an example that the camera is not activated before operation 803.

According to an embodiment, in operation 803, the wearable electronic device may identify light of the LED. In an example case in which the LED light is identified, operation 805 may be performed. In an example case in which the LED light is not identified, operation 807 may be performed.

According to an embodiment, the wearable electronic device may identify whether light from the LED is emitted using a light emitting detection device (e.g., the second camera (e.g., the third camera module 255 of FIG. 2 or the second camera module 313, 314, 315, or 316, or a sensor) for detecting light emission. Using the light emitting detection device, the wearable electronic device may identify that there is no abnormality with the LED when it is identified that light is emitted from the LED (when LED light is identified) and identify that there is an abnormality with the LED when it is not identified that light is emitted from the LED (when LED light is not identified).

According to an embodiment, the wearable electronic device may identify whether light is emitted from the LED using the light emitting detection device at a time when the LED is activated (hereinafter referred to as an activation time or on-timing) or after the activation time. The activation time of the LED may be, for example, a time after a designated period (e.g., 0.01 seconds) from the time when the camera execution request is obtained. A normal LED may initiate emitting light at the activation time.

According to an embodiment, in operation 805, the wearable electronic device may activate the camera based on identifying the LED light. The wearable electronic device may identify that there is no abnormality with the LED based on identifying the LED light. In this case, the wearable electronic device may activate the camera and provide a notification indicating that the camera is activated through the activated LED.

According to an embodiment, in operation 807, the wearable electronic device may provide abnormality information based on the LED light not being identified. The wearable electronic device may identify that there is an abnormality with the LED (e.g., light emitter) based on the LED light not being identified. Accordingly, the wearable electronic device may provide abnormality information for indicating that there is an abnormality with the LED.

According to an embodiment, the abnormality information may include information indicating that there is an abnormality with the LED and/or information inquiring the user about the use of the camera. An example of a screen including the information is described below with reference to FIG. 11.

According to an embodiment, in operation 809, the wearable electronic device may identify whether the use of the camera is selected. In an example case in which it is identified that the use of the camera is not selected, operation 811 may be performed. In an example case in which it is identified that the use of the camera is selected, operation 813 may be performed.

According to an embodiment, the wearable electronic device may identify whether the use of the camera is selected based on a user input. For example, the wearable electronic device may identify whether the use of the camera is selected based on a user input (e.g., user gesture input) through abnormality information.

According to an embodiment, in operation 811, the wearable electronic device may maintain the inactive state of the camera based on identifying that use of the camera is not selected. In an example case in which there is an abnormality with the LED providing a notification as described above, and the user does not wish to use the camera, the wearable electronic device may continue to maintain the camera in the inactive state.

According to an embodiment, in operation 813, the wearable electronic device may activate the camera based on identifying that the use of the camera is selected. Even though there is an abnormality with the LED providing a notification, the user may wish to use the camera. In this case, the user may select (e.g., decide) to use the camera through a user input, and the wearable electronic device may activate the camera based on the user input of selecting the use of the camera.

According to an embodiment, in operation 815, the wearable electronic device may identify whether an alternative notification is available. For example, the wearable electronic device may identify whether an alternative notification method that provides an alternative notification is available by identifying whether an alternative notification method is available. Operation 815 may include, but is not limited to, operation 440 of FIG. 4. As an example of an alternative notification method and a description of providing an alternative notification using the alternative notification method, the description of operation 440 of FIG. 4 may apply. In an example case in which it is identified that the alternative notification is not available, operation 817 may be performed. In an example case in which it is identified that the alternative notification is available, operation 819 may be performed.

According to an embodiment, in operation 817, the wearable electronic device may deactivate the camera based on identifying that the alternative notification is not available. As such, in an example case in which there is an abnormality with the LED providing a notification and an alternative notification is not available, the wearable electronic device may deactivate the camera to protect other people's privacy even when the user wishes to use the camera.

According to an embodiment, in operation 819, the wearable electronic device may maintain the camera in the active state based on identifying that the alternative notification is not available. As such, in an example case in which there is an abnormality with the LED providing a notification, but an alternative notification is available, the wearable electronic device may activate the camera and provide an alternative notification indicating that the camera is activated through an alternative notification method.

Figure 9A:
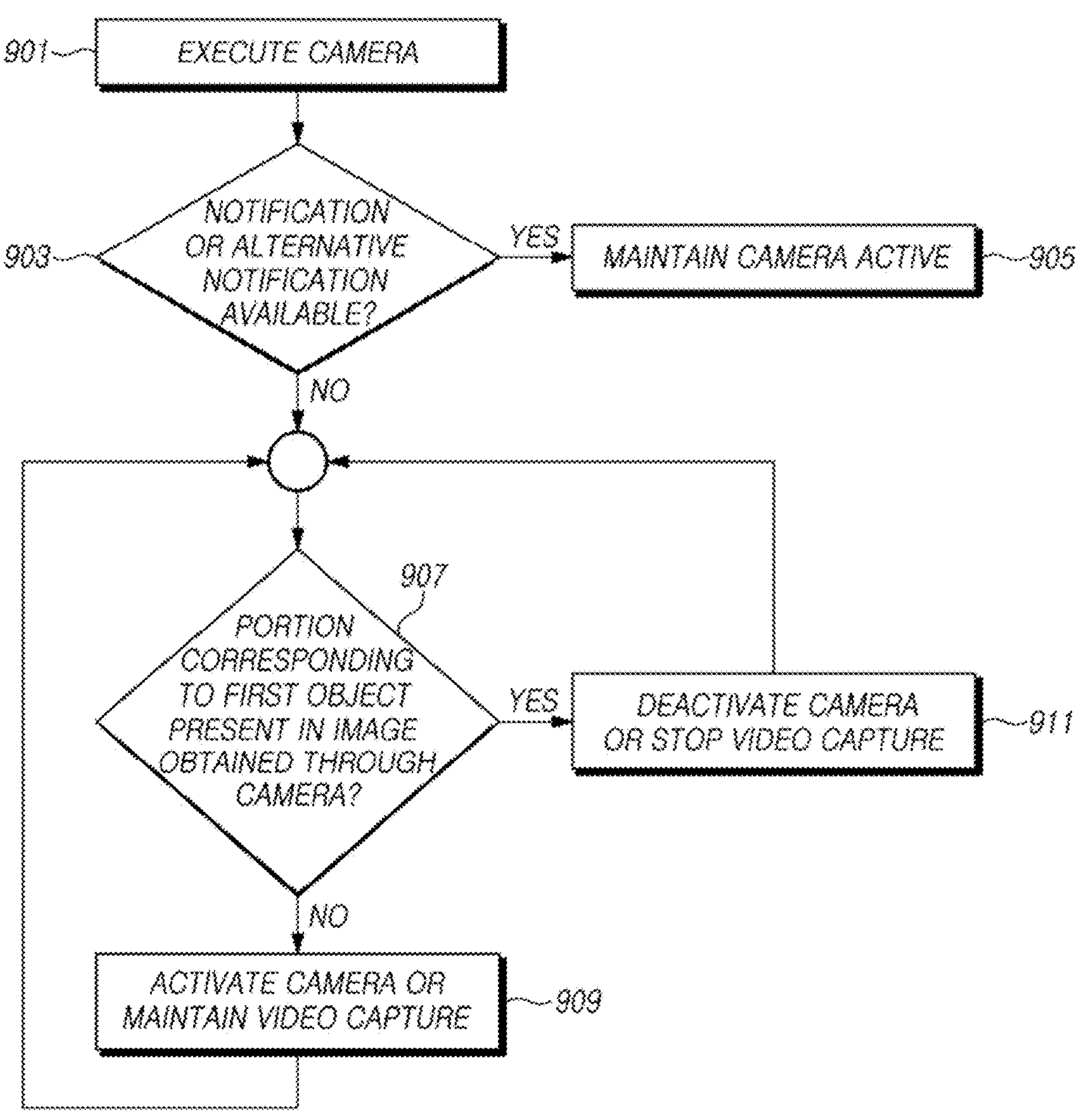
FIG. 9A is a flowchart illustrating a camera status and an operation for a wearable electronic device to determine whether to deactivate a camera based on a captured image according to an embodiment of the disclosure.

FIG. 9A is a flowchart illustrating a camera status and an operation for a wearable electronic device to determine whether to deactivate a camera based on a captured image according to an embodiment of the disclosure.

Figure 9B:
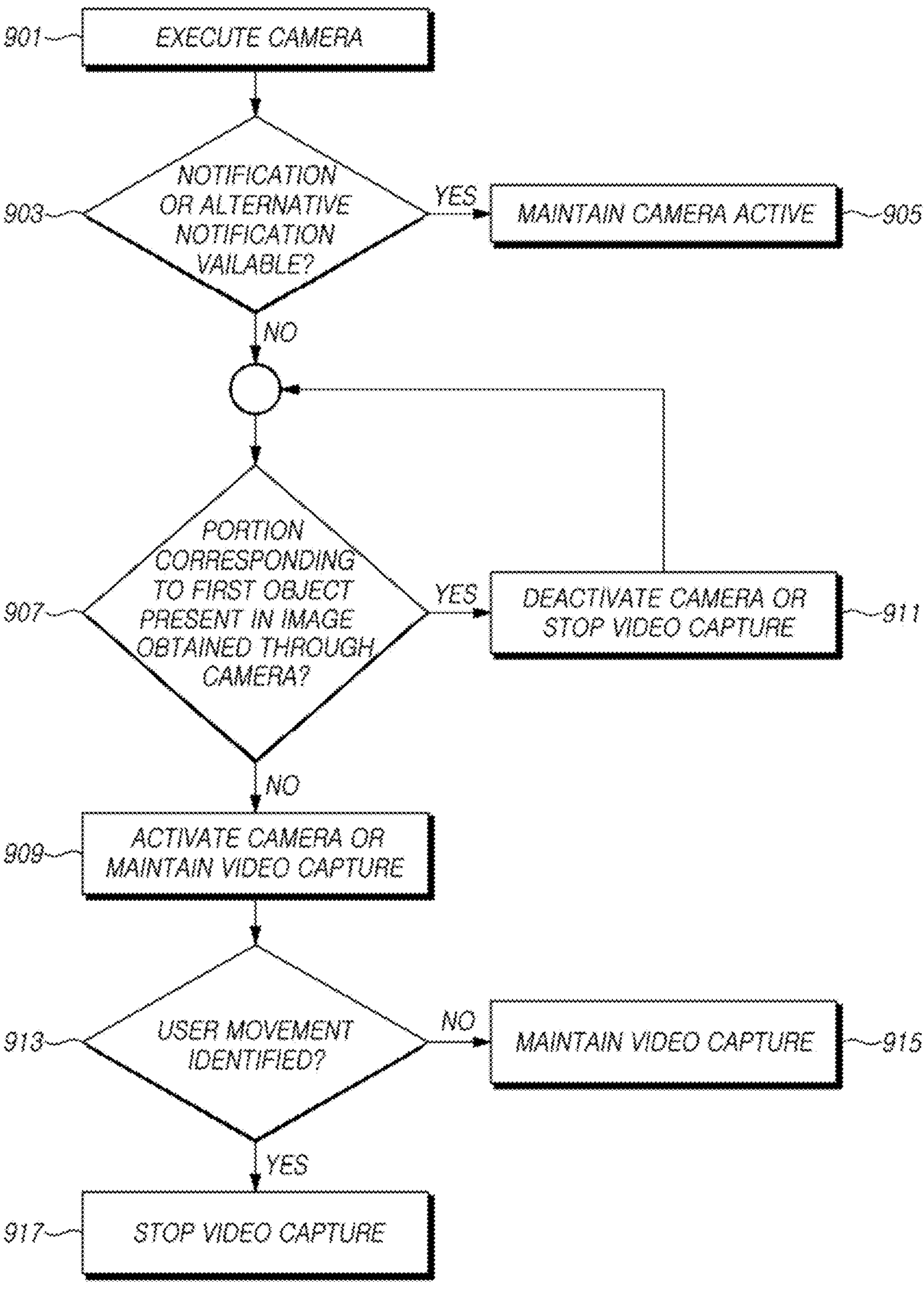
FIG. 9B is a flowchart illustrating a camera status and an operation for a wearable electronic device to determine whether to deactivate a camera based on a captured image and a user movement according to an embodiment of the disclosure.

FIG. 9B is a flowchart illustrating a camera status and an operation for a wearable electronic device to determine whether to deactivate a camera based on a captured image and a user movement according to an embodiment of the disclosure.

The components and operations of the components described with reference to FIGS. 9A and 9B may be identical in whole or part to the components and operations of the components described with reference to FIGS. 1 to 8. The components and operations of the components described with reference to FIGS. 9A and 9B may be identical in whole or part to the components and operations of the components described with reference to FIGS. 10 to 14.

FIG. 9A may be an embodiment related to the operations of FIG. 5A. FIG. 9A may be an embodiment related to the operations of FIG. 5B.

Referring to FIG. 9A, according to an embodiment, in operation 901, a wearable electronic device (e.g., the wearable electronic device 200 of FIG. 2 or the wearable electronic device 300 of FIGS. 3A and 3B) (e.g., an HMD device) may execute a camera (e.g., the second camera module 253 of FIG. 2 or the first camera module 311 or 312 of FIGS. 3A and 3C). The execution operation of the camera in operation 901 may include, but is not limited to, an operation of obtaining a camera execution request of the camera in operation 410. In the embodiment of FIG. 9A, for convenience of description, before operation 903, it is described as an example that the camera is activated and the image (e.g., video) capture function is activated.

According to an embodiment, in operation 903, the wearable electronic device may identify whether a notification or an alternative notification is available. The operation of identifying whether a notification is available may be, for example, the same as operation 420 of FIG. 4 or may include operation 420. The operation of identifying whether an alternative notification is available may be, for example, the same as operation 440 of FIG. 4 or may include operation 440. In an example case in which it is identified that a notification or alternative notification is available, operation 905 may be performed. In an example case in which it is identified that the notification or alternative notification is not available, operation 907 may be performed.

According to an embodiment, in operation 905, the wearable electronic device may maintain the camera in the active state based on identifying that a notification or alternative notification is available.

According to an embodiment, in operation 907, the wearable electronic device may identify whether the portion corresponding to the first object is present (e.g., included) in the image obtained through the camera. In an example case in which it is identified that the portion corresponding to the first object is not present (e.g., included) in the image, operation 909 may be performed. In an example case in which it is identified that the portion corresponding to the first object is present (e.g., included) in the image, operation 911 may be performed. For example, the operation 907 may be the same as operation 520 of FIGS. 5A and 5B.

According to an embodiment, in operation 909, the wearable electronic device may maintain the camera in the active state and maintain image (e.g., video) capture based on identifying that the portion corresponding to the first object is not present (e.g., included) in the image. For example, the operation 909 may be the same as operation 540 of FIG. 5A.

According to an embodiment, in operation 911, the wearable electronic device may deactivate the camera or stop the image (e.g., video) capture function based on identifying that the portion corresponding to the first object is present (e.g., included) in the image. The operation 911 may be the same as operation 530 of FIGS. 5A and 5B.

According to an embodiment, the wearable electronic device may repeatedly perform operations 907 to 909 while the camera is maintained in an active state. Accordingly, operations 907 to 909 are performed on each image continuously captured through the activated camera to continuously identify whether a person is present (e.g., included) in the image while the camera is active, even though a notification and an alternative notification may not be provided.

Referring to FIG. 9B, according to an embodiment, in operation 901, a wearable electronic device (e.g., the wearable electronic device 200 of FIG. 2 or the wearable electronic device 300 of FIGS. 3A and 3B) (e.g., an HMD device) may execute a camera (e.g., the second camera module 253 of FIG. 2 or the first camera module 311 or 312 of FIGS. 3A and 3C). The execution operation of the camera in operation 901 may include, but is not limited to, an operation of obtaining a camera execution request of the camera in operation 410. In the embodiment of FIG. 9B, for convenience of description, it is described as an example that the camera is activated and the image (e.g., video) capture function is activated before operation 903.

According to an embodiment, in operation 903, the wearable electronic device may identify whether a notification or an alternative notification is available. The operation of identifying whether a notification is available may be, for example, the same as operation 420 of FIG. 4 or may include operation 420. The operation of identifying whether an alternative notification is available may be, for example, the same as operation 440 of FIG. 4 or may include operation 440. In an example case in which it is identified that a notification or alternative notification is available, operation 905 may be performed. In an example case in which it is identified that the notification or alternative notification is not available, operation 907 may be performed.

According to an embodiment, in operation 905, the wearable electronic device may maintain the camera in the active state based on identifying that a notification or alternative notification is available.

According to an embodiment, in operation 907, the wearable electronic device may identify whether the portion corresponding to the first object is present (e.g., included) in the image obtained through the camera. In an example case in which it is identified that the portion corresponding to the first object is not present (e.g., included) in the image, operation 909 may be performed. In an example case in which it is identified that the portion corresponding to the first object is present (e.g., included) in the image, operation 911 may be performed. Operation 907 may be, for example, the same as operation 520 of FIGS. 5A and 5B.

According to an embodiment, in operation 909, the wearable electronic device may maintain the camera in the active state and maintain the image (e.g., video) capture function based on identifying that the portion corresponding to the first object is not present (e.g., included) in the image. The operation 909 may be, for example, the same as operation 540 of FIG. 5A.

According to an embodiment, in operation 911, the wearable electronic device may deactivate the camera or stop the image (e.g., video) capture function based on identifying that the portion corresponding to the first object is present (e.g., included) in the image. For example, the operation 911 may be the same as operation 530 of FIGS. 5A and 5B.

According to an embodiment, in operation 913, the wearable electronic device may determine whether a movement of the user of the wearable electronic device is identified. In an example case in which the user movement is identified, operation 917 may be performed. In an example case in which the user movement is not identified, operation 919 may be performed.

According to an embodiment, the wearable electronic device may determine whether a movement of the user wearing the wearable electronic device is identified based on at least one image obtained through the second camera (e.g., the third camera module 255 of FIG. 2 or the second camera module 313, 314, 315, or 316).

According to an embodiment, in operation 915, the wearable electronic device may maintain the camera in the active state and maintain image (e.g., video) capture based on the movement of the user not being identified. Operation 915 is, e.g., the same as operation 545 of FIG. 5B, or may include at least one of detailed operations of operation 545.

According to an embodiment, in operation 917, the wearable electronic device may maintain the camera in the active state based on identifying the movement of the user, but may stop the image (e.g., video) capture. For example, the operation 917 may be the same as operation 543 of FIG. 5B, or may include at least one of detailed operations of operation 543.

Figure 10A:
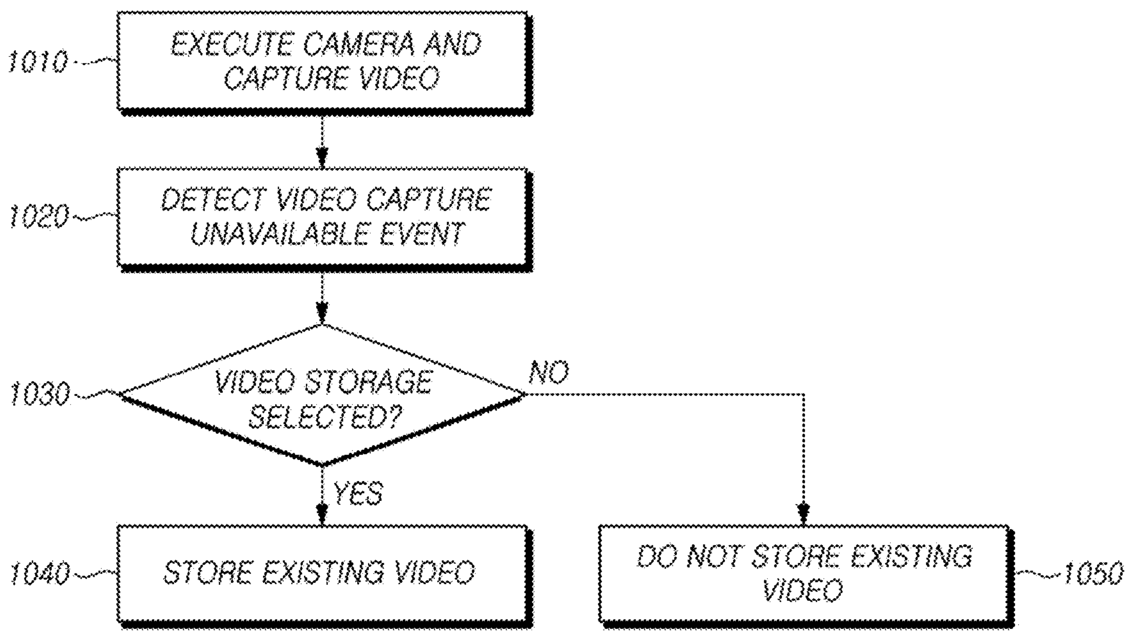
FIG. 10A is a flowchart illustrating a method for a wearable electronic device to process a video according to detection of a video capture unavailable event according to an embodiment of the disclosure.

FIG. 10A is a flowchart illustrating a method for a wearable electronic device to process a video according to detection of a video capture unavailable event according to an embodiment of the disclosure.

Figure 10B:
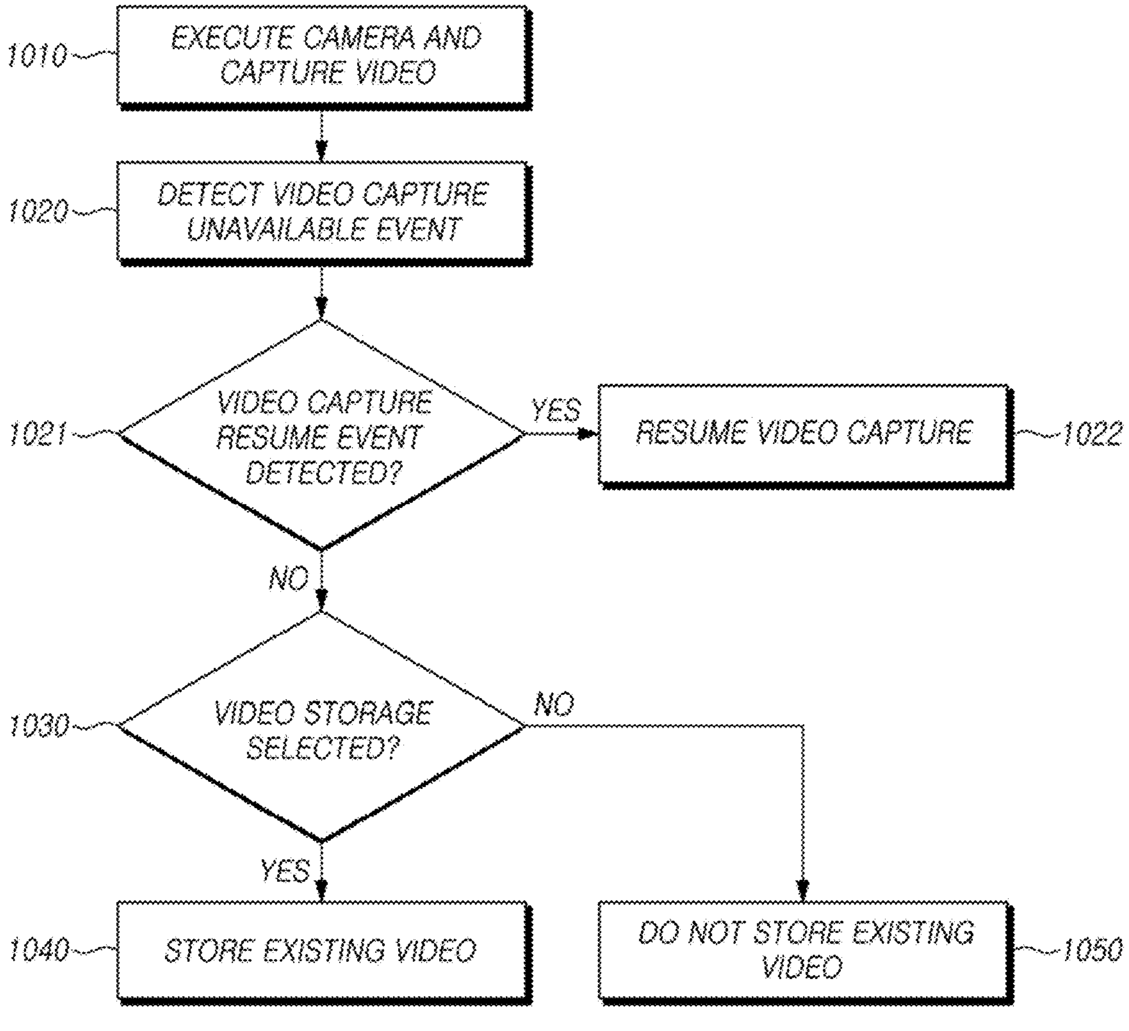
FIG. 10B is a flowchart illustrating a method for a wearable electronic device to process a video according to detection of a video recording resume event according to an embodiment of the disclosure.

FIG. 10B is a flowchart illustrating a method for a wearable electronic device to process a video according to detection of a video recording resume event according to an embodiment of the disclosure.

The components and operations of the components described with reference to FIGS. 10A and 10B may be identical in whole or part to the components and operations of the components described with reference to FIGS. 1 to 9B. The components and operations of the components described with reference to FIGS. 10A and 10B may be identical in whole or part to the components and operations of the components described with reference to FIGS. 11 to 14.

Referring to FIG. 10A, according to an embodiment, in operation 1010, a wearable electronic device (e.g., the wearable electronic device 200 of FIG. 2 or the wearable electronic device 300 of FIGS. 3A and 3B) (e.g., an HMD device) may execute a camera (e.g., the second camera module 253 of FIG. 2 or the first camera module 311 or 312 of FIGS. 3A and 3C) and may activate a video capture function. Accordingly, the camera is activated, and a video may be captured through the activated camera. The execution operation of the camera in operation 1010 may include, but is not limited to, an operation of obtaining a camera execution request of the camera in operation 410.

According to an embodiment, in operation 1020, the wearable electronic device may detect a video capture unavailable event (or a video capture stop event) during video capture through a camera. The wearable electronic device may stop video capture (or turn-off the video capture function) or may deactivate the camera based on detection of a video capture unavailable event (or video capture stop event) during video capture through the camera. In an example case in which a video capture unavailable event (or a video capture stop event) is not detected during video capture through the camera, the wearable electronic device may maintain video capture through the camera and store the captured video.

According to an embodiment, a video capture unavailable event (or video capture stop event) may be detected when a situation in which video capture is unavailable (or a situation in which video capture is to be stopped) occurs during video capture through an activated camera. The situation in which video capture is unavailable (video capture unavailable situation) or the situation in which video capture is to be stopped (video capture stop situation) may include, a first situation in which a notification is not available, a second situation in which a notification is not available and an alternative notification is not available, a third situation in which a notification and an alternative notification are not available, and it is identified that a first object (e.g., a person) is present (e.g., included) in the captured image, and/or a fourth situation in which a notification and an alternative notification are not available, and a first object (e.g., a person) is not present (e.g., included) in the captured image, but a movement of the user of the wearable electronic device is identified, but is not limited thereto. The first situation may be detected when an abnormality with the light emitter (e.g., LED) is identified during video capture through the camera, through, for example, operation 420 of FIG. 4, operation 605 of FIG. 6, operation 703 of FIG. 7, or operation 803 of FIG. 8. The second situation may be detected when it is identified that the alternative notification method is not available during video capture through the camera through, e.g., operation 440 of FIG. 4, operation 617 of FIG. 6, operation 715 of FIG. 7, and operation 815 of FIG. 8. The third situation may be detected when it is identified that the portion corresponding to the first object is present (included) in the image captured during video capture through the camera through, e.g., operation 520 of FIGS. 5A and 5B or 907 of FIGS. 9A and 9B. The fourth situation may be detected when a movement of the user wearing the wearable electronic device is identified during video capture through the camera, through, e.g., operation 541 of FIG. 5B or operation 913 of FIG. 9B.

According to an embodiment, in operation 1030, the wearable electronic device may identify whether video storage is selected. In an example case in which it is identified that video storage is selected, operation 1040 may be performed. In an example case in which it is identified that video storage is not selected, operation 1050 may be performed.

According to an embodiment, the wearable electronic device may provide video storage selection information for video storage. The video storage selection information may include first information for indicating that a video capture unavailable situation occurs, and/or second information for inquiring the user about selection of video storage. According to an embodiment, the wearable electronic device may identify whether video storage is selected based on a user input (e.g., user gesture input) through video storage selection information. An example of a screen including video storage selection information is described below with reference to FIG. 12.

According to an embodiment, in operation 1040, the wearable electronic device may store video captured until before video capture is stopped (e.g., disabled) based on identifying that video storage is selected. According to an embodiment, in operation 1050, the wearable electronic device may not store video captured until before video capture is stopped (e.g., turned-off or disabled) based on identifying that video storage is not selected. According to an embodiment of the disclosure, video captured until before video capture is stopped may be referred to as an existing video. As such, in the embodiment of FIG. 5A, when a video capture unavailable situation (or video capture stop situation) occurs, it may be determined whether to store the existing video through the selection of the user.

Referring to FIG. 10B, according to an embodiment, in operation 1010, a wearable electronic device (e.g., the wearable electronic device 200 of FIG. 2 or the wearable electronic device 300 of FIGS. 3A and 3B) (e.g., an HMD device) may execute a camera (e.g., the second camera module 253 of FIG. 2 or the first camera module 311 or 312 of FIGS. 3A and 3C) and may activate the video capture function. Accordingly, the camera may be activated and a video may be captured through the camera. Operation 1010 of FIG. 10B may be the same as operation 1010 of FIG. 10A.

According to an embodiment, in operation 1020, the wearable electronic device may detect a video capture unavailable event (or a video capture stop event) during video capture through a camera. The wearable electronic device may stop video capture or may deactivate the camera based on detection of a video capture unavailable event (or video capture stop event) during video capture through the camera. In an example case in which a video capture unavailable event (or a video capture stop event) is not detected during video capture through the camera, the wearable electronic device may maintain video capture through the camera and store the captured video. Operation 1020 of FIG. 10B may be the same as operation 1020 of FIG. 10A.

According to an embodiment, in operation 1021, the wearable electronic device may identify whether a video capture resume event (or video capture start event) is detected. In an example case in which a video capture resume event (or video capture start event) is detected, operation 1022 may be performed. In an example case in which a video capture resume event (or video capture start event) is not detected, operation 1030 may be performed.

According to an embodiment, the video capture resume event (or video capture start event) may be detected when a situation in which video capture may be resumed (or a situation in which video capture may be started) occurs while the camera is deactivated or video capture is stopped (e.g., video capture function disabled or turned-off). The situation in which video capture is available (video capture available situation) or the situation in which video capture may be started (video capture start situation) may include, a first situation in which a notification is available, a second situation in which an alternative notification is available, a third situation in which a notification and an alternative notification are not available, and it is identified that a first object (e.g., a person) is not present (e.g., included) in the captured image, and/or a fourth situation in which a notification and an alternative notification are not available, and a first object (e.g., a person) is not present (e.g., included) in the captured image, and a movement of the user of the wearable electronic device is not identified, but is not limited thereto. The first situation may be detected when an abnormality with the light emitter (e.g., LED) is not identified during video capture deactivation or video capture stop, through, e.g., operation 420 of FIG. 4, operation 605 of FIG. 6, operation 703 of FIG. 7, or operation 803 of FIG. 8. The second situation may be detected, e.g., when it is identified that the alternative notification method is available during camera deactivation or video capture stop through, e.g., operation 440 of FIG. 4, operation 617 of FIG. 6, operation 715 of FIG. 7, and operation 815 of FIG. 8. The third situation may be detected when it is identified that the portion corresponding to the first object is not present (e.g., included) in the image captured during video capture stop through, e.g., operation 520 of FIGS. 5A and 5B or 907 of FIGS. 9A and 9B. The fourth situation may be detected when a movement of the user wearing the wearable electronic device is not identified during video capture stop, through, e.g., operation 541 of FIG. 5B or operation 913 of FIG. 9B.

According to an embodiment, in operation 1022, the wearable electronic device may resume video capture based on detecting a video capture resume event, and manage the video captured before video capture is stopped to be connected with video newly captured as video capture is resumed. The wearable electronic device may perform a camera activation operation and/or video capture function activation operation in order to resume (or start) video capture. According to an embodiment, the video captured before video capture is stopped may be referred to as an existing video, and the video newly captured because video capture is resumed (or started) may be referred to as a new video. By connecting the existing video and the new video, one connected video may be generated and stored.

According to an embodiment, in operation 1030, the wearable electronic device may identify whether video storage is selected. In an example case in which it is identified that video storage is selected, operation 1040 may be performed. In an example case in which it is identified that video storage is not selected, operation 1050 may be performed. Operation 1030 of FIG. 10B may be the same as operation 1030 of FIG. 10A.

According to an embodiment, in operation 1040, the wearable electronic device may store the video captured before video capture is stopped based on identifying that video storage (e.g., video save) is selected. According to an embodiment, in operation 1050, the wearable electronic device may store the video captured before video capture is stopped (e.g., video capture function disabled or turned-off) based on identifying that video storage (e.g., video save) is not selected. Operations 1040 and 1050 of FIG. 10B may be the same as operations 1040 and 1050, respectively, of FIG. 10A.

Figure 11:
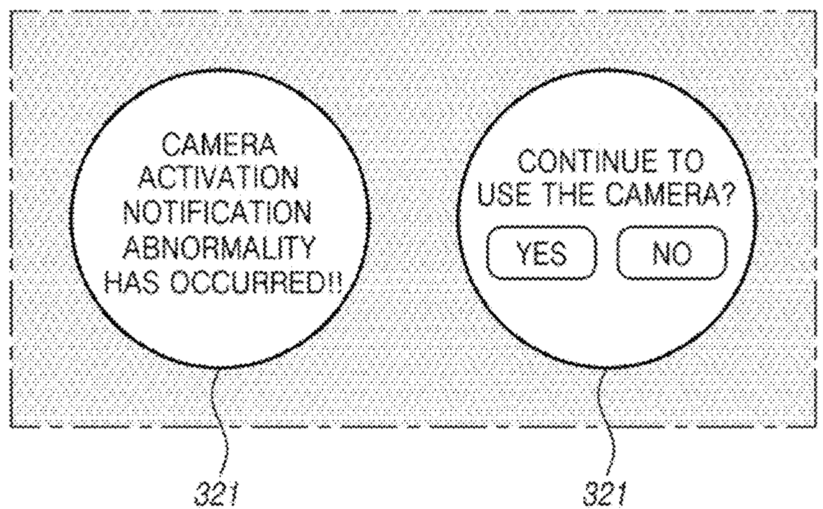
FIG. 11 illustrates an example of a screen including abnormality information according to an embodiment of the disclosure.

FIG. 11 illustrates an example of a screen including abnormality information according to an embodiment of the disclosure.

The components and operations of the components described with reference to FIG. 11 may be identical in whole or part to the components and operations of the components described with reference to FIGS. 1 to 10. The components and operations of the components described with reference to FIG. 11 may be identical in whole or part to the components and operations of the components described with reference to FIGS. 12 to 14.

Referring to FIG. 11, a wearable electronic device (e.g., the wearable electronic device 200 of FIG. 2 or the wearable electronic device 300 of FIGS. 3A and 3B) (e.g., an HMD device) may provide abnormality information. According to an embodiment, the wearable electronic device may display a screen providing abnormality information for indicating that there is an abnormality with a light emitter (e.g., LED)

or a notification using the light emitter through a display (e.g., the display member 201 of FIG. 2 or the first display 321 of FIG. 3B).

According to an embodiment, the abnormality information may include first information for indicating that there is an abnormality with the light emitter and/or second information for inquiring the user about the use of the camera. For example, the first information may be provided through a message such as "Camera activation notification abnormality has occurred!!", as illustrated on the screen displayed on the left display of FIG. 11. For example, the second information may be provided through a message such as "Continue to use the camera?" as illustrated on the screen displayed on the right display of FIG. 11.

According to an embodiment, the wearable electronic device may provide a user interface for selecting the use of the camera (e.g., continuing to use the camera) as abnormality information together with the second information. The user interface for selecting the use of the camera may include, but is not limited to, a first selectable item (e.g., "yes" item) for selecting the use of the camera and/or a second selectable item (e.g., "no" item) for not selecting the use of the camera. The user interface for selecting the use of the camera may be displayed on the same screen (e.g., the screen displayed on the right display of FIG. 11) together with the second information, but is not limited thereto.

According to an embodiment, the wearable electronic device may identify whether the use (e.g., continuous use) of the camera is selected through a user input (e.g., user gesture input) obtained through the user interface for selecting the use of the camera. For example, the wearable electronic device may identify that the use of the camera (e.g., continuous use) is selected when a user input (e.g., user gesture input) is obtained (or received) to select the first selectable item. In this case, the wearable electronic device may maintain the camera in the active state or activate the camera. Accordingly, even when a notification through the light emitter is not provided, the camera may be continuously used according to the selection of the user. For example, when a user input (e.g., user gesture input) to select the second selectable item is obtained (or received), the wearable electronic device may identify that the use of the camera (e.g., continued use) is not selected. In this case, the wearable electronic device may maintain the camera in the inactive state or deactivate the camera. Accordingly, when a notification through the light emitter may not be provided, the camera may not be used according to the selection of the user.

Figure 12:
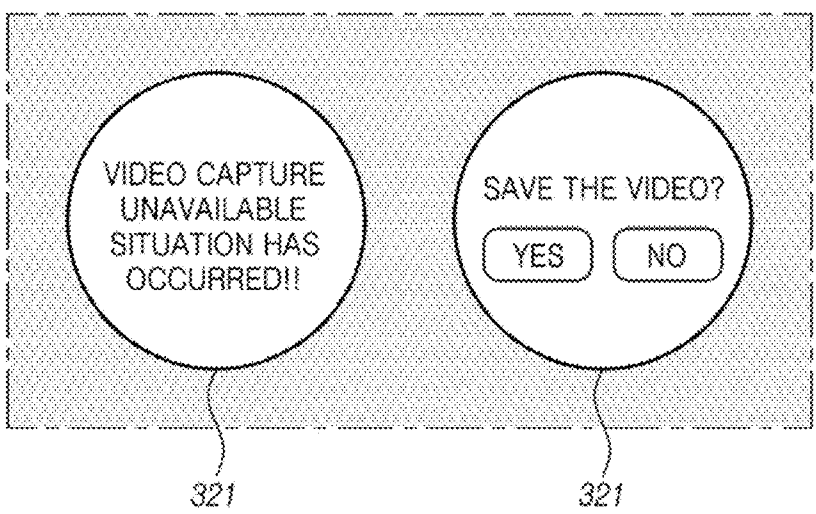
FIG. 12 illustrates an example of a screen including video save selection information according to an embodiment of the disclosure.

FIG. 12 illustrates an example of a screen including video save selection information according to an embodiment of the disclosure.

The components and operations of the components described with reference to FIG. 12 may be identical in whole or part to the components and operations of the components described with reference to FIGS. 1 to 10. The components and operations of the components described with reference to FIG. 12 may be identical in whole or part to the components and operations of the components described with reference to FIGS. 13 to 14.

Referring to FIG. 12, a wearable electronic device (e.g., the wearable electronic device 200 of FIG. 2 or the wearable electronic device 300 of FIGS. 3A and 3B) (e.g., an HMD device) may provide video storage selection information. According to an embodiment, the wearable electronic device may display a screen providing video storage selection information for video storage through a display (e.g., the display member 201 of FIG. 2 or the first display 321 of FIG. 3B).

According to an embodiment, the video storage selection information may include first information for indicating that a video capture unavailable situation occurs, and/or second information for inquiring the user about selection of video storage. For example, the first information may be provided through a message such as "Video capture unavailable situation has occurred!!", as illustrated on the screen displayed on the left display of FIG. 12. For example, the second information may be provided through a message such as "Save the video?" as illustrated on the screen displayed on the right display of FIG. 12.

According to an embodiment, the wearable electronic device may provide a user interface for selecting video storage as video storage selection information together with the second information. The user interface for selecting video storage may include, but is not limited to, a first selectable item (e.g., "yes" item) for selecting the storage of the existing video and/or a second selectable item (e.g., "no" item) for not selecting the storage of the existing video. The user interface for selecting video storage may be displayed on the same screen (e.g., the screen displayed on the right display of FIG. 12) together with the second information.

According to an embodiment, the wearable electronic device may identify whether the storage of the existing video is selected through a user input (e.g., user gesture input) obtained through the user interface for selecting video storage. For example, the wearable electronic device may identify that the storage of the existing video is selected when a user input (e.g., user gesture input) is obtained (or received) to select the first selectable item. In this case, the wearable electronic device may store the existing video according to the selection of the user. For example, when a user input (e.g., user gesture input) to select the second selectable item is obtained (or received), the wearable electronic device may identify that the storage of the existing video is not selected. In this case, the wearable electronic device may not store the existing video according to the selection of the user.

FIG. 13 is a view illustrating an example of a camera status according to an embodiment of the disclosure.

The components and operations of the components described with reference to FIG. 13 may be identical in whole or part to the components and operations of the components described with reference to FIGS. 1 to 12. The components and operations of the components described with reference to FIG. 12 may be identical in whole or part to the components and operations of the components described with reference to FIG. 14.

Referring to FIG. 13, according to an embodiment, the operation state of the camera (e.g., the second camera module 253 of FIG. 2 or the first camera module 311 or 312 of FIGS. 3A and 3C) may include an active state 1310 or an inactive state 1320.

According to an embodiment, the active state 1310 may be a state in which the camera is activated. The active state 1310 may include, but is not limited to, a first active state 1311 and/or a second active state 1312.

According to an embodiment, the first active state 1311 may be a state in which the camera is activated, but the image (e.g., video) capture and/or storage function is not activated. The camera in the first active state 1311 may obtain (e.g., capture) an image of the external environment of a wearable electronic device (e.g., the wearable electronic device 200 of FIG. 2 or the wearable electronic device 300 of FIGS. 3A and 3B) (e.g., an HMD device). For example, the camera in the first active state 1311 may obtain an image of the external environment in the front direction of the wearable electronic device. According to an embodiment, when the wearable electronic device is the device of FIGS. 3A to 3C, the image obtained in the first active state 1311 may be displayed on the display of the wearable electronic device (e.g., the first display 321 of FIG. 3B) as a preview image to provide an image of the external environment to the user wearing the wearable electronic device. According to an embodiment, when the wearable electronic device is the device of FIGS. 2A and 2B, the image obtained in the first active state 1311 may not be displayed, e.g., through the display of the wearable electronic device (e.g., the first display 321 of FIG. 3B) as a preview image. The image obtained in the first active state 1311 may not be stored.

According to an embodiment, the second active state 1312 may be a state in which the camera is activated and an image (e.g., video) capture and/or storage function is also activated. The camera in the second active state 1312 may capture an image of the external environment as a still image or a video. For example, the camera in the second active state 1310 may capture and store an image of the external environment in the front direction of the wearable electronic device as a still image or video. The captured may be displayed through the display of the wearable electronic device to provide an image of the external environment to the user wearing the wearable electronic device. The captured image may or may not be stored according to the selection of the user.

According to an embodiment, the wearable electronic device may switch the active state 1310 of the camera from the first active state 1311 to the second active state 1312 in response to detecting an image (e.g., video) capture start event 1303. The image capture start event 1303 may include an image capture resume event (e.g., video capture resume event (or video capture start event) of operation 1021 of FIG. 10B). The image capture start event 1303 may be detected, e.g., when at least one of the situations of the video capture start event (or the video capture start event) of operation 1021 of FIG. 10B is identified. In an example case in which the first active state 1311 is switched from the first active state 1311 to the second active state 1312, the wearable electronic device may activate the image capture and/or storage function.

According to an embodiment, the wearable electronic device may switch the active state 1310 of the camera from the second active state 1312 to the first active state 1311 in response to detecting an image (e.g., video) capture stop event 1303. According to an embodiment, the image capture stop event may be detected when a situation in which image capture is stopped or prevented occurs during image capture through the activated camera. The image capture stop event 1304 may include an image capture stop event (e.g., a video capture stop event (or a video capture stop event) of operation 1020 of FIGS. 10A and 10B). The video capture stop event 1304 may be detected, e.g., when at least one of the situations of the video capture stop event (or video capture stop event) of operation 1020 of FIGS. 10A and 10B is identified. In an example case in which the second active state 1312 is switched from the second active state 1312 to the first active state 1311, the wearable electronic device may deactivate the image capture and/or storage function.

According to an embodiment, the inactive state 1320 may be a state in which the camera is deactivated. The camera in the inactive state 1320 may not obtain (e.g., capture) an image of the external environment of the wearable electronic device. Accordingly, the captured image may not be displayed through the display in the form of a preview image.

According to an embodiment, the wearable electronic device may switch the state of the camera from the inactive state 1320 to the active state 1310 in response to detecting the activation event 1301 in the inactive state 1320. The activation event 1301 may be detected when an abnormality with the light emitter (e.g., LED) is not identified through, e.g., operation 420 of FIG. 4, operation 605 of FIG. 6, operation 703 of FIG. 7, or operation 803 of FIG. 8. The activation event 1301 may be detected, e.g., when it is identified that an alternative notification method is available through operation 440 of FIG. 4, operation 617 of FIG. 6, operation 715 of FIG. 7, and operation 815 of FIG. 8. The activation event 1301 may be detected, e.g., when it is identified that the portion corresponding to the first object is not present (e.g., included) in the image captured through operation 520 of FIGS. 5A and 5B or operation 907 of FIGS. 9A and 9B. The activation event 1301 may be identified when a movement of the user wearing the wearable electronic device is not identified through, e.g., operation 541 of FIG. 5B or operation 913 of FIG. 9B.

According to an embodiment, the wearable electronic device may switch the state of the camera from the active state 1310 to the inactive state 1320 in response to detecting the deactivation event 1302 in the active state 1310. The deactivation event 1302 may be detected, e.g., when an abnormality with the light emitter (e.g., LED) is identified through operation 420 of FIG. 4, operation 605 of FIG. 6, operation 703 of FIG. 7, or operation 803 of FIG. 8. The deactivation event 1302 may be detected, e.g., when it is identified that the alternative notification method is not available through operation 440 of FIG. 4, operation 617 of FIG. 6, operation 715 of FIG. 7, and operation 815 of FIG. 8. The deactivation event 1302 may be detected, e.g., when it is identified that the portion corresponding to the first object is present (e.g., included) in the image captured through operation 520 of FIGS. 5A and 5B or operation 907 of FIGS. 9A and 9B. The deactivation event 1302 may be detected, e.g., when a movement of the user wearing the wearable electronic device is identified through operation 541 of FIG. 5B or operation 913 of FIG. 9B.

Figure 14:
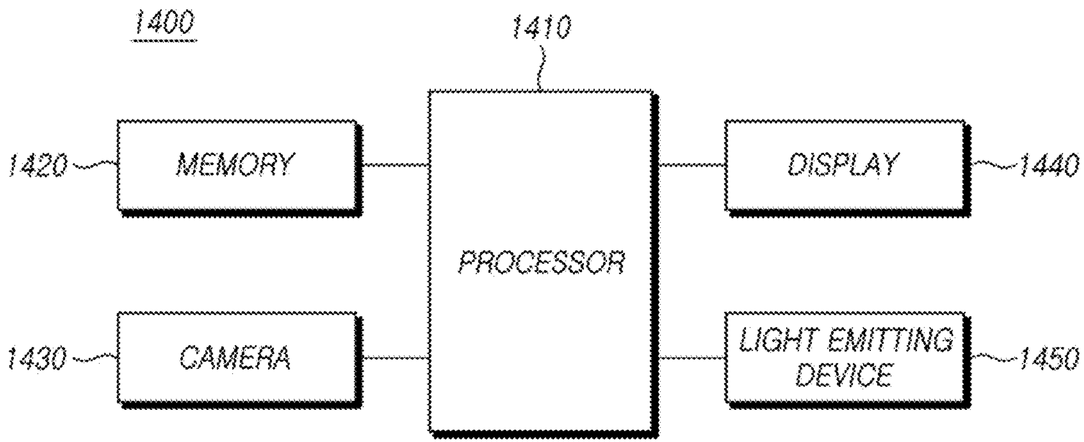
FIG. 14 is a view illustrating an example of a configuration of an electronic device according to an embodiment of the disclosure.

FIG. 14 is a view illustrating an example of a configuration of an electronic device according to an embodiment of the disclosure.

The components and operations of the components described with reference to FIG. 14 may be identical in whole or part to the components and operations of the components described with reference to FIGS. 1 to 13.

Referring to FIG. 14, an electronic device 1400 (e.g., the electronic device 101 of FIG. 1, the wearable electronic device 200 of FIG. 2, or the wearable electronic device 300 of FIGS. 3A to 3C) may include at least one processor 1410, at least one memory 1420, at least one camera 1430, at least one display 1440, and/or a light emitting device 1450. However, the disclosure is not limited thereto. and as such, according to another embodiment, the electronic device 1400 may include one or more other components. For example, the electronic device 1400 may further include at least one sensor and/or other components (e.g., a communication circuit) required to perform at least one operation. According to an embodiment, the electronic device 1400 may be implemented to be identical or similar to the electronic device 101 of FIG. 1, the wearable electronic device 200 of FIG. 2, or the wearable electronic device 300 of FIGS. 3A to 3C.

According to an embodiment, the electronic device 1400 may be worn (e.g., worn on the head of the user) by the user. For example, the electronic device 1400 may be implemented as an AR-type HMD device (e.g., the wearable electronic device 200 of FIG. 2) or a VR/VST-type HMD device (e.g., the wearable electronic device 300 of FIGS. 3A to 3C).

According to an embodiment, at least one processor 1410 (e.g., the processor 120 of FIG. 1) of the electronic device 1400 may be electrically and/or operatively connected to the memory 1420, the camera 1430, the display 1440, and/or the light emitting device 1450 by a component such as a communication bus.

According to an embodiment, the at least one processor 1410 may control the overall operation of the electronic device 1400 and may perform at least one operation (e.g., at least one of the operations described above in connection with FIGS. 1 to 13). The processor 1410 may perform an operation or data processing related to control and/or communication of at least one other component of the electronic device 1400. The processor 1410 may include at least one processing circuit that executes instructions stored in the memory 1420.

According to an embodiment, the at least one processor 1410 may include various processing circuits and/or multiple processors. One or more of the at least one processor 1410 may be configured to individually and/or collectively perform various functions described in the disclosure. The processor 1410 may include various processing circuitry and/or multiple processors. In the disclosure, when it is described that "processor", "at least one processor", and "one or more processors" are configured to perform various functions, these terms may include, for example, a situation in which one processor performs some of the cited functions and another processor(s) performs other some of the cited functions. For example, as used herein, the term "processor" may include various processing circuitry, including at least one processor, wherein one or more of at least one processor, individually and/or collectively in a distributed manner, may be configured to perform various functions described herein. However, the disclosure is not limited thereto, and as such, an embodiment of the disclosure may also include, but is not limited to, a situation in which a single processor may perform all of the cited functions. Additionally, the at least one processor 390 may include, for example, a combination of processors performing various functions cited/initiated in a distributed manner. The at least one processor 1410 may execute program instructions to achieve or perform various functions.

According to an embodiment, at least one processor 1410 may include, but is not limited to, at least one of a central processing unit (CPU), a neural processing unit (NPU), a graphics processing unit (GPU), a micro processing unit (MPU), a micro controller unit (MCU), an application processor (AP), a communication processor (CP), a system on chip (SoC), or an integrated circuit (IC) sensor hub, a supplementary processor, an application specific integrated circuit (ASIC), or a field programmable gate arrays (FPGA), and may include a plurality of cores.

According to an embodiment, the memory 1420 (e.g., the memory 130 of FIG. 1) may store various data that may be used to control the operation of each component of the electronic device 1400. The memory 1420 may include at least one storage medium that stores, for example, a plurality of application programs used in the electronic device 1420, data for controlling the operation of the electronic device 1400, and instructions. The instructions stored in the memory 1420 may, when executed by at least one processor 1410, cause the electronic device 1400 to perform at least one operation (e.g., at least one of the operations described above in connection with FIGS. 1 to 13).

According to an embodiment, the memory 1420 may store at least one program for processing and controlling the processor 1410, and may store input and/or output data. The memory 1420 may store at least one artificial intelligence (AI) model. The memory 1420 may include, but is not limited to, at least one of a flash memory type, a hard disk type, a multimedia card micro type, a card type memory (e.g., secure digital (SD) or extreme digital (XD) memory, random access memory (RAM), static random access memory (SRAM), read-only memory (ROM), electrically erasable programmable read-only memory (EEPROM), programmable read-only memory (PROM), a magnetic memory, a magnetic disc, or an optical disc. According to an example, a web storage or a cloud server that performs a storage function on the Internet may be operated by the electronic device 1400.

According to an embodiment, at least one camera 1430 may convert light input from outside into an electrical signal. For example, the at least one camera 1430 may convert light input from outside of a housing of the camera or a housing of the electronic device 1440 into an electrical signal. The electronic device 1400 may capture images (e.g., still images or videos) through the camera 1430. The electronic device 1400 may comprise at least one camera 1430. The at least one camera 1430 may include a first camera (e.g., the second camera module 253 of FIG. 2 or the first camera module 311 or 312 of FIGS. 3A and 3C), a second camera (e.g., the third camera module 255 of FIG. 2 or the second camera module 313, 314, 315, or 316 of FIGS. 3A and 3C), and/or a third camera (e.g., the first camera module 251 of FIG. 2 or the camera module 325 or 326 for face recognition of FIG. 3B).

According to an embodiment, at least one display 1440 may visually provide information to the outside (e.g., the user) of the electronic device 1400. The at least one display 1440 may include a first display (e.g., the display member 201 of FIG. 2 or the first display 321 of FIG. 3B) and/or a second display (e.g., the second display 350 of FIG. 3C).

According to an embodiment, at least one light emitting device 1450 may emit light. For example, the light emitting device 1450 may emit light of at least one color. The at least one light emitter 1450 may include at least one light emitter (e.g., the light emitter 270 of FIG. 2 or the light emitter 340 of FIG. 3C) (e.g., LED). The light emitting device 1450 may be used to provide a notification about the operation state of the camera 1430.

According to an embodiment of the disclosure, when an HMD device captures the external environment using a camera, it is necessary to provide a notification indicating that the camera is activated to protect the privacy of other people around the camera. The notification may be provided through, for example, a light emitting device (e.g., LED). The HMD device needs to identify whether such a notification is provided normally and perform an appropriate operation according to the identification.

According to an embodiment, the HMD device may determine whether there is an abnormality with the light emitting device providing a notification indicating that the camera is activated and perform operations according to the determination.

According to an embodiment, in an example case in which there is an abnormality with the light emitting device providing a notification, the HMD device may determine whether an alternative notification method providing an alternative notification indicating that the camera is activated instead of a notification is available instead of the notification using the light emitting device and perform operations according to the determination.

According to an embodiment, in an example case in which there is an abnormality with the light emitting device providing a notification and an alternative notification method providing an alternative notification are not available, the HMD device may determine whether the camera may be used based on an image captured through the camera and/or a movement of the user wearing the HMD device and perform operations according to the determination.

According to an embodiment of the disclosure, a HMD (e.g., the electronic device 101 of FIG. 1, the wearable electronic device 200 of FIG. 2, the wearable electronic device 300 of FIGS. 3A to 3C, or the electronic device 1400 of FIG. 14) may comprise a first camera (e.g., the second camera module 253 of FIG. 2, the first camera module 311 or 312 of FIGS. 3A and 3C, or the camera 1430 of FIG. 14), a first display (e.g., the display member 201 of FIG. 2, the first display 321 of FIG. 3B, or the display 1400 of FIG. 14), a light emitter (e.g., the light emitter 270 of FIG. 2, the light emitter 340 of FIG. 3C, or the light emitting device 1450 of FIG. 14), at least one processor (e.g., the processor 120 of FIG. 1 or the processor 1410 of FIG. 14) including processing circuitry, and memory (e.g., the memory 130 of FIG. 1 or the memory 1420 of FIG. 14) including at least one storage medium storing instructions. The instructions may, when executed individually or collectively by the at least one processor, enable the HMD device to perform at least one operation. The at least one operation may include, based on obtaining an execution request of the first camera, identifying whether the light emitter used for providing a notification indicating that the first camera is activated has an abnormality. The at least one operation may include, based on identifying that the light emitter has no abnormality, providing the notification using the light emitter. The at least one operation may include, based on identifying that the light emitter has the abnormality, identifying whether an alternative notification method used to provide an alternative notification indicating that the first camera is activated is available.

According to an embodiment, the at least one operation may include, based on identifying that the alternative notification method is available, providing the alternative notification using the alternative notification method.

According to an embodiment, the at least one operation may include, based on identifying that the alternative notification method is not available, identify whether a portion corresponding to first object is present (e.g., included) in a first image obtained through the activated first camera, and based on identifying that the portion corresponding to at least the part of a person (or, figure) is present (e.g., included) in the first image, deactivating the first camera or prevent capturing through the first camera.

According to an embodiment, the HMD device may include a second camera (e.g., the third camera module 255 of FIG. 2 or the second camera module 313, 314, 315, or 316 of FIGS. 3A and 3C). The at least one operation may include, based on identifying that the portion corresponding to the first object is not present (e.g., included) in the first image, determining whether a movement of a user wearing the HMD device is identified based on at least one image obtained through the second camera, when the movement of the user is identified, maintaining the first camera in an active state while preventing capturing through the first camera, and when the movement of the user is not identified, maintaining the first camera in the active state while allowing capturing through the first camera.

According to an embodiment, the at least one operation may include, upon identifying that the alternative notification method is not available, deactivating the first camera.

According to an embodiment, the HMD device may include a second display (e.g., the second display 350 of FIG. 3C). The alternative notification method may correspond to a method for visually providing the alternative notification through the second display, and the second display and the first camera may be provided (or, disposed) on a first side (e.g., surface) of a housing of the HMD device, and the first display may be provided (or, disposed) on a second side (e.g., surface) of the housing.

According to an embodiment, the HMD device may include a speaker (e.g., the speaker 216 of FIG. 2 or the speaker 318 of FIGS. 3A to 3C). The alternative notification method may correspond to a method for audibly providing the alternative notification through the speaker.

According to an embodiment, the HMD device may include a second camera. The alternative notification method may visually provide the alternative notification through an IR LED included in the second camera.

According to an embodiment, the HMD device may include a sensor. According to an embodiment, the process or operation of identifying (e.g., determining) the abnormality with the light emitter may include identifying whether the light emitter has the abnormality based on a current of the light emitter obtained through the sensor.

According to an embodiment, the HMD device may include a connector (e.g., the interface 177 or connecting terminal 178 of FIG. 1) for connecting the light emitter to a PCB including the at least one processor. Identifying whether the light emitter has the abnormality may include identifying whether the light emitter and the at least one processor are electrically connected based on a detection signal detected through at least one pin of the connector and, based on a result of the identification, identifying whether the light emitter has the abnormality.

According to an embodiment, the HMD device may include a second camera. According to an embodiment, the process or operation of identifying (e.g., determining) the abnormality with the light emitter may include identifying whether light is emitted through the light emitter through the second camera and, based on a result of the identification, identifying whether the light emitter has the abnormality.

An embodiment of the disclosure and terms used therein are not intended to limit the technical features described in the disclosure to specific embodiments, and should be understood to include various modifications, equivalents, or substitutes of the embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 of FIG. 1 or external memory 138 of FIG. 1) that is readable by a machine (e.g., the electronic device 101 of FIG. 1). For example, a processor (e.g., the processor 120 of FIG. 1) of the machine (e.g., the electronic device 101 of FIG. 1) may invoke at least one of the one or more instructions stored in the storage medium, and execute the at least one of the one or more instructions, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. In an example case in which the computer program product is distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to an embodiment, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A head-mounted display (HMD) device, comprising:

a first camera configured to capture an image in a front direction of the HMD device;

a first display;

a light emitter;

at least one processor comprising processing circuitry; and memory comprising at least one storage medium storing instructions, wherein the instructions are configured to, when individually or collectively executed by the at least one processor, cause the HMD device to:

based on obtaining an execution request of the first camera, identifying whether the light emitter, which is configured to provide a notification indicating that the first camera is activated, has an abnormality;

based on identifying that the light emitter has no abnormality, control the light emitter to output the notification;

based on identifying that the light emitter has the abnormality, identify whether an alternative notification method is available to provide an alternative notification indicating that the first camera is activated; and based on identifying that the alternative notification method is available, output the alternative notification using the alternative notification method, wherein the instructions are further configured to, when individually or collectively executed by the at least one processor, cause the HMD device to:

based on identifying that the alternative notification method is not available, identify whether a portion of a person is present in a first image obtained through the activated first camera; and based on identifying that the portion of the person is present in the first image, deactivate the first camera or stop capturing of the first image through the first camera.

2. The HMD device of claim 1, further comprising a second camera, wherein the instructions are further configured to, when individually or collectively executed by the at least one processor, cause the HMD device to:

based on identifying that the portion of the person is not present in the first image, determine whether a movement of the HMD device is identified based on at least one image obtained through the second camera;

in case that the movement of the HMD device is identified, maintain the first camera in an active state while preventing the capturing of the first image through the first camera; and in case that the movement of the HMD device is not identified, maintain the first camera in the active state while allowing the capturing of the first image through the first camera.

3. The HMD device of claim 1, wherein the instructions are further configured to, when individually or collectively executed by the at least one processor, cause the HMD device to:

upon identifying that the alternative notification method is not available, deactivate the first camera.

4. The HMD device of claim 1, further comprising a second display, wherein the alternative notification method corresponds to a method for visually providing the alternative notification through the second display, and wherein the second display and the first camera are provided on a first surface of a housing of the HMD device, and the first display is provided on a second surface of the housing.

5. The HMD device of claim 1, further comprising a speaker, wherein the alternative notification method corresponds to a method for audibly providing the alternative notification through the speaker.

6. The HMD device of claim 1, further comprising a second camera, wherein the alternative notification method visually provides the alternative notification through an infrared (IR) light emitting diode (LED) of the second camera.

7. The HMD device of claim 1, further comprising a sensor, wherein the identifying whether the light emitter has the abnormality comprises identifying whether the light emitter has the abnormality based on a current of the light emitter obtained through the sensor.

8. The HMD device of claim 1, further comprising:

a connector configured to connect the light emitter to a printed circuit board (PCB) comprising the at least one processor, wherein the identifying whether the light emitter has the abnormality comprises identifying whether the light emitter and the at least one processor are electrically connected based on a detection signal detected through at least one pin of the connector and, based on a result of the identifying whether the light emitter and the at least one processor are electrically connected, identifying whether the light emitter has the abnormality.

9. The HMD device of claim 1, further comprising a second camera, wherein the identifying whether the light emitter has the abnormality comprises identifying whether light is emitted through the light emitter through the second camera and, based on a result of the identifying whether the light is emitted through the light emitter through the second camera, identifying whether the light emitter has the abnormality.

10. A method of a head-mounted display (HMD) device, the method comprising:

based on obtaining an execution request of a first camera capturing an image in a front direction of the HMD device, identifying whether a light emitter, which is configured to provide a notification indicating that the first camera is activated, has an abnormality;

based on identifying that the light emitter has no abnormality, controlling the light emitter to output the notification;

based on identifying that the light emitter has the abnormality, identifying whether an alternative notification method is available to provide an alternative notification indicating that the first camera is activated; and based on identifying that the alternative notification method is available, outputting the alternative notification using the alternative notification method, wherein the method further comprises:

based on identifying that the alternative notification method is not available, identifying whether a portion of a person is present in a first image obtained through the activated first camera; and based on identifying that the portion of the person is present in the first image, deactivating the first camera or stopping capturing of the first image through the first camera.

11. The method of claim 10, wherein the HMD device includes a second camera, and wherein the method further comprises:

based on identifying that the portion of the person is not present in the first image, determining whether a movement of the HMD device is identified based on at least one image obtained through the second camera;

in case that the movement of the HMD device is identified, maintaining the first camera in an active state while preventing the capturing of the first image through the first camera; and in case that the movement of the HMD device is not identified, maintaining the first camera in the active state while allowing the capturing of the first image through the first camera.

12. The method of claim 10, further comprising:

upon identifying that the alternative notification method is not available, deactivating the first camera.

13. The method of claim 10, wherein the HMD device includes a second display, wherein the alternative notification method corresponds to a method for visually providing the alternative notification through the second display, and wherein the second display and the first camera are provided on a first surface of a housing of the HMD device, and the first display is provided on a second surface of the housing.

14. The method of claim 10, wherein the HMD device includes a speaker, and wherein the alternative notification method corresponds to a method for audibly providing the alternative notification through the speaker.

15. The method of claim 10, wherein the HMD device includes a second camera, and wherein the alternative notification method visually provides the alternative notification through an infrared (IR) light emitting diode (LED) of the second camera.

16. The method of claim 10, wherein the HMD device includes a sensor, and wherein identifying whether the light emitter has the abnormality comprises identifying whether the light emitter has the abnormality based on a current of the light emitter obtained through the sensor.

17. The method of claim 10, wherein the HMD device includes a connector for connecting the light emitter to a printed circuit board (PCB) including at least one processor, and wherein the identifying whether the light emitter has the abnormality comprises identifying whether the light emitter and the at least one processor are electrically connected based on a detection signal detected through at least one pin of the connector and, based on a result of the identifying whether the light emitter and the at least one processor are electrically connected, identifying whether the light emitter has the abnormality.

18. The method of claim 10, wherein the HMD device includes a second camera, and wherein the identifying whether the light emitter has the abnormality comprises identifying whether light is emitted through the light emitter through the second camera and, based on a result of the identifying whether the light is emitted through the light emitter through the second camera, identifying whether the light emitter has the abnormality.

* * * * *